United States Patent
Tseng et al.

(10) Patent No.: US 9,655,195 B2
(45) Date of Patent: May 16, 2017

(54) LIGHTING CONTROL METHOD AND SYSTEM

(71) Applicant: NANYANG TECHNOLOGICAL UNIVERSITY, Singapore (SG)

(72) Inventors: King Jet Tseng, Singapore (SG); Szu-Cheng Chien, Singapore (SG); Yee Loon Sum, Singapore (SG); Boon Hee Soong, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 15/040,212

(22) Filed: Feb. 10, 2016

(65) Prior Publication Data

US 2016/0242244 A1     Aug. 18, 2016

(30) Foreign Application Priority Data

Feb. 13, 2015   (SG) .......................... 10201501171Q

(51) Int. Cl.
*F21V 29/00*     (2015.01)
*H05B 33/08*     (2006.01)

(52) U.S. Cl.
CPC ....... *H05B 33/086* (2013.01); *H05B 33/0869* (2013.01); *Y02B 20/346* (2013.01)

(58) Field of Classification Search
CPC .......... F21S 10/00; F21S 10/02; F21S 10/023; F21K 9/00; F21Y 2113/00; F21Y 2113/10; F21Y 2113/13

(Continued)

(56) References Cited

U.S. PATENT DOCUMENTS 7,135,664 B2   11/2006   Vornsand et al.
7,288,902 B1   10/2007   Melanson
(Continued)

FOREIGN PATENT DOCUMENTS

EP        0266120 A2     5/1988
WO    2011004019 A1     1/2011

*Primary Examiner* — Jason M Crawford
(74) *Attorney, Agent, or Firm* — Sughrue Mion, PLLC

(57) ABSTRACT

Various embodiments provide a method of controlling a lighting device to generate light of a desired natural scene. The lighting device may include a plurality of warm white LEDs having a first intensity range and a plurality of cool white LEDs having a second intensity range. The method may include dividing each of the first intensity range and the second intensity range into a predetermined number of intensity levels; initializing the plurality of warm white LEDs to a first intensity level and initializing the plurality of cool white LEDs to a second intensity level, the first intensity level and the second intensity level being determined based on the desired natural scene; iteratively adjusting at least one of the intensity level of the warm white LEDs or the intensity level of the cool white LEDs by at least one level in each iteration, until the light generated by the lighting device matches a desired correlated color temperature predetermined for the desired natural scene; and iteratively adjusting at least one of the intensity level of the warm white LEDs or the intensity level of the cool white LEDs, until the light generated by the lighting device matches a desired illuminance predetermined for the desired natural scene.

19 Claims, 17 Drawing Sheets

(58) Field of Classification Search
USPC ...... 315/151, 178, 185 R, 192; 362/231, 267
See application file for complete search history.

(56) References Cited

U.S. PATENT DOCUMENTS

| | | | |
|---|---|---|---|
| 7,572,028 | B2 | 8/2009 | Mueller et al. |
| 7,679,281 | B2 | 3/2010 | Kim et al. |
| 7,845,823 | B2 | 12/2010 | Mueller et al. |
| 8,018,135 | B2 | 9/2011 | Van De Ven et al. |
| 8,232,745 | B2 | 7/2012 | Chemel et al. |
| 8,668,359 | B2 | 3/2014 | Welén |
| 8,740,663 | B2 * | 6/2014 | Kim .................. F21K 9/00 445/23 |
| 8,814,374 | B2 | 8/2014 | Van Der Poel et al. |
| 8,836,243 | B2 | 9/2014 | Eisele et al. |
| 2002/0179817 | A1 | 12/2002 | Pitigoi-Aron et al. |
| 2003/0100837 | A1 | 5/2003 | Lys et al. |
| 2007/0274093 | A1 * | 11/2007 | Haim .................. G02B 6/0028 362/561 |
| 2008/0149810 | A1 | 6/2008 | Tracy et al. |
| 2010/0188022 | A1 * | 7/2010 | Gerlach .................. H05B 37/02 315/312 |
| 2012/0286669 | A1 * | 11/2012 | Yan .................... H05B 33/0869 315/151 |
| 2012/0311926 | A1 * | 12/2012 | Mittelmark ............... F24F 3/16 47/17 |
| 2013/0075769 | A1 * | 3/2013 | Yan ........................ F21K 9/90 257/89 |
| 2013/0211608 | A1 * | 8/2013 | Farrell ..................... G06F 1/26 700/286 |
| 2013/0223058 | A1 * | 8/2013 | Briggs .................. F21V 21/005 362/225 |
| 2013/0229114 | A1 | 9/2013 | Eisele et al. |
| 2013/0258654 | A1 * | 10/2013 | Yan ......................... F21V 5/04 362/231 |
| 2014/0117877 | A1 | 5/2014 | Mapel et al. |
| 2014/0361709 | A1 * | 12/2014 | Krijn .................. H05B 33/0821 315/294 |

* cited by examiner

LIGHTING CONTROL METHOD AND SYSTEM

CROSS-REFERENCE TO RELATED APPLICATIONS

The present application claims the benefit of the Singapore provisional patent application No. 10201501171Q filed on 13 Feb. 2015, the entire contents of which are incorporated herein by reference for all purposes.

TECHNICAL FIELD

Embodiments relate generally to a lighting control method and a lighting control system. Embodiments further relate to a lighting device.

BACKGROUND

In order to access the performance of buildings under daylight, scaled models are usually used for the purpose of research and practice. The reason for using scaled models is mainly due to convenience, cost effectiveness, proof-of-concept and time saving. Recently, the emergence of research into energy efficient Green Buildings has facilitated new ideas in areas of lighting power grid (electricity), BMS (Building Management System), ACMV (Air Conditioning and Mechanical Ventilation), etc. However, over the past ten years, studies have found that there exist performance discrepancies between results gathered from scaled models and actual implementation, resulting in over estimation of the performances. This over estimation of between 30% to 105% in favor of the scaled model can be attributed to model details/replication, surface reflectance, light leakages, fenestration details, photometric properties, luxmeters sensing aperture size, and window transmittance.

To overcome the limitation of the scaled models, actual 1:1 size models should be used under actual outdoor exposure. This solution is the most direct in implementation and at the same time, provides an exact representation of the actual deployment. Unfortunately, the associated behaviors between Earth and Sun is not a constant one. The solar spectrum, geometry of solar radiation, and intensity varies depending on diurnal and annual variation, location, atmospheric conditions, and terrestrial conditions. With these in consideration, studies conducted outdoors are limited by the location, weather, and seasons.

It is therefore necessary to have a man-made environment, where all variables can be controlled deterministically. To access the performance of daylighting on buildings, an indoor testing facility with controlled emulation of the daylight would provide a solution to address the above issues, wherein an indoor test-bed may be shielded from external elements to provide a predictable 24/7 testing environment for research and practice.

Efforts have been made to enhance the light artificially produced by either conventional fluorescent or newer LEDs (light-emitting devices) in terms of color, color temperature, and brightness by using a combination of different types of lighting sources, such as different color LEDs, to produce light of different colors.

Attempts have been made to improve white light artificially produced for industry and commercial applications, such as car show rooms, jewellery shops, clothing stores and offices. The main concern is to produce light with high Color Rendering Index (CRI) so that objects viewed under these lights can reproduce the natural colors when viewed under the Sun.

Other attempts have also be made to use different colors of white light (Correlated Color Temperature, CCT) to improve and influence the behavior of humans, for example, to improve the mental state of office workers or reduce the recovery time of patients in the hospitals.

In order to achieve the desired results, different light sources (e.g., LEDs), typically 3 to 6 types of LEDs are arranged in a manner, typically in circular form or in strip form, to mix the required colors or white color temperature. Some of the proposed light fixtures are in modular form, which can be scaled up to produce a larger light source. Each module can be controlled independently by either changing the current and/or voltages to the light sources or through some digital drivers.

Despite the recognition of the need for variable CCT and intensity of light sources for use in various applications, it is not revealed how the uniformity, CCT, and intensity can be achieved in a single device. In addition, the need of having a lighting device that can emulate the daylight for research purposes in buildings and also for design purposes in architectural projects is not indicated.

Therefore, there is a need for a device that can emulate the daylight in terms of CCT and intensity relating to the diurnal, seasonal and location parameters. There is also a need for a device which is large enough to project the required light onto a surface of an actual "life size" test bed uniformly.

SUMMARY

Various embodiments provide a method of controlling a lighting device to generate light of a desired natural scene. The lighting device may include a plurality of warm white LEDs having a first intensity range and a plurality of cool white LEDs having a second intensity range. The method may include dividing each of the first intensity range and the second intensity range into a predetermined number of intensity levels; initializing the plurality of warm white LEDs to a first intensity level and initializing the plurality of cool white LEDs to a second intensity level, the first intensity level and the second intensity level being determined based on the desired natural scene; iteratively adjusting at least one of the intensity level of the warm white LEDs or the intensity level of the cool white LEDs by at least one level in each iteration, until the light generated by the lighting device matches a desired correlated color temperature predetermined for the desired natural scene; and iteratively adjusting at least one of the intensity level of the warm white LEDs or the intensity level of the cool white LEDs, until the light generated by the lighting device matches a desired illuminance predetermined for the desired natural scene.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized, and structural and logical changes may be made without departing from the scope of the invention. The various embodiments are not necessarily mutually exclusive, as some embodiments can be combined with one or more other embodiments to form new embodiments.

Various embodiments provide a lighting device and a method/system for controlling the lighting device to generate light that is variable within a desired range of correlated color temperature (CCT) and illuminance (lux). The lighting device of various embodiments may employ two different types of light-emitting devices (LED) which together, superimpose to produce a wide spectrum of white light and illuminance.

Various embodiments provide a lighting device. The lighting device includes a plurality of warm white LEDs and a plurality of cool white LEDs arranged in a matrix form, wherein the warm white LED alternates with the cool white LED along each row and each column of the matrix. The lighting device is also referred to as a daylight emulator in this description.

Figure 1:
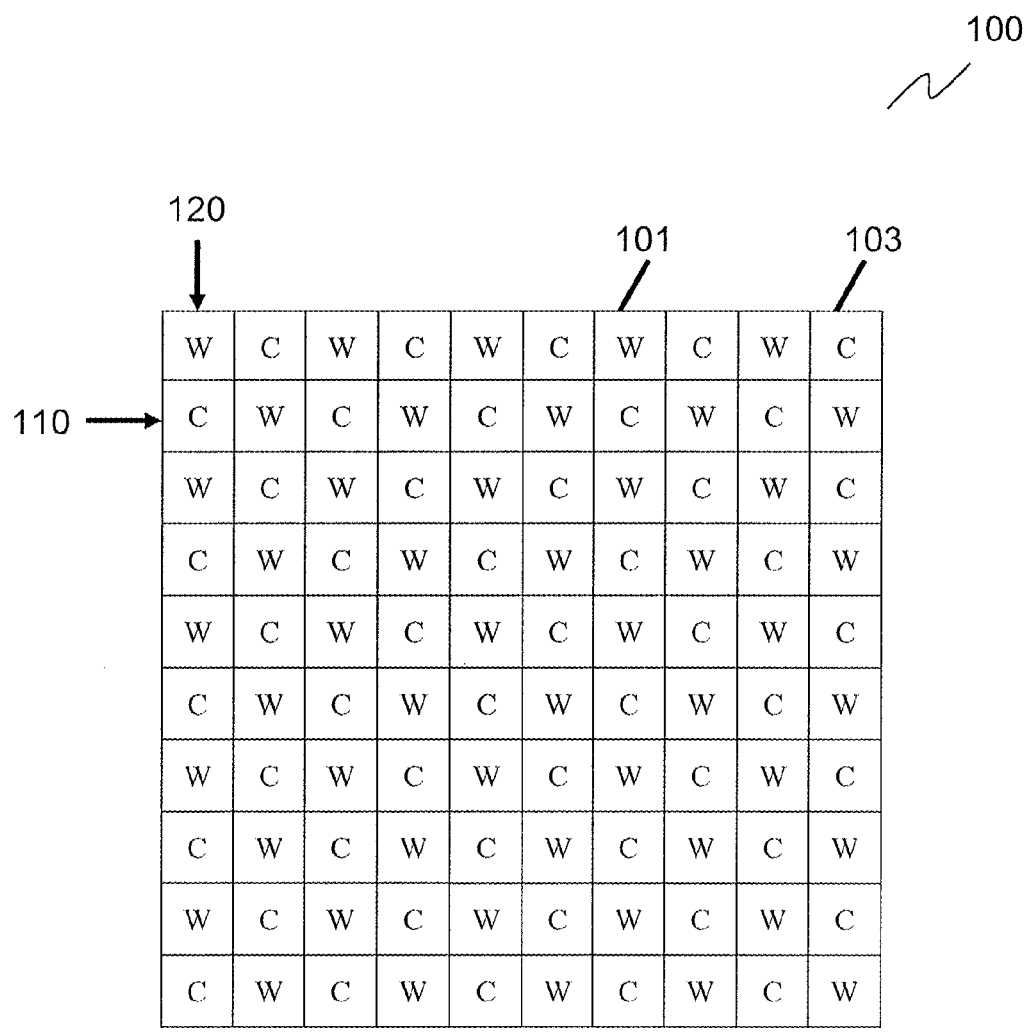
FIG. 1 shows a lighting device according to various embodiments.

FIG. 1 shows a lighting device 100 according to various embodiments.

As shown in FIG. 1, the lighting device includes a plurality of warm white LEDs 101 (W) and a plurality of cool white LEDs 103 (C). The warm white LEDs 101 and the cool white LEDs 103 are arranged in a matrix form, wherein the warm white LED 101 alternates with the cool white LED 103 along each row 110 and each column 120 of the matrix.

In various embodiments, the plurality of warm white LEDs 101 may have a correlated color temperature of about 2400K. The plurality of cool white LEDs 103 may have a correlated color temperature of about 12000K. Correlated color temperature is characterized in color reproduction fields according to the temperature in degrees Kelvin (K) of a black body radiator that radiates the same color light as the light in question. In various embodiments, the plurality of warm white LEDs 101 may have a correlated color temperature selected from about 2400K to 3000K. The plurality of cool white LEDs 103 may have a correlated color temperature selected from about 5000K to 12000K. In various embodiments, the plurality of warm white LEDs 101 may have the same correlated color temperature. The plurality of cool white LEDs 103 may have the same correlated color temperature.

The arrangement of the two types of LEDs 101, 103 according to various embodiments may be configured or controlled to reproduce a wide spectrum of the visible daylight with a correlated color temperature from 2400 K to 10000 K, an illuminance from 0 to 40,000 Lux with 0.5 meter away from the surface of a test-bed, a color rendering index (CRI) of 80 and above, 20% illuminance uniformity, and 10% CCT uniformity.

In order to produce light of a uniform CCT and intensity according to a desired natural scene, the arrangement of light sources, i.e. the LEDs 101, 103, may be designed in consideration of the following parameters: distance between the LEDs and the projected surface, contour of the surface, number of different types of light sources reproducing the daylight, brightness of each type of light source, and type of lens to be used. Some of these parameters may be defined from the structure of an indoor test bed as shown in FIG. 2.

Figure 2:
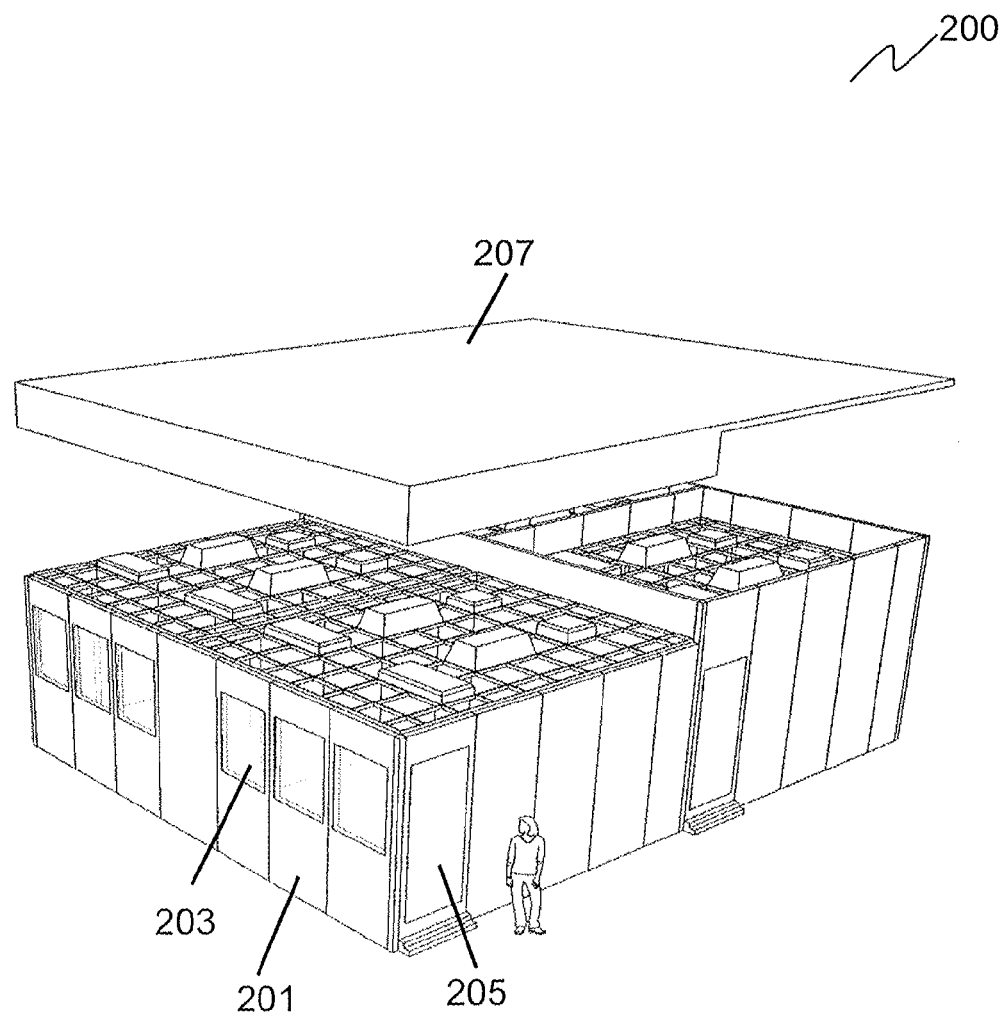
FIG. 2 shows an indoor test bed according to various embodiments.

FIG. 2 shows an indoor test bed 200 according to various embodiments, including flat walls 201, windows 203, doors 205 and a ceiling 207. The contour of the surface of the test bed 200 may be considered to be flat. This is also representative of common building structures with flat facade.

As in all indoor structures, space is a constraint that needs to be maximally utilized. Accordingly, the parameter of the distance between the lighting device and the facade of the test bed need to be short. In various embodiments, a distance of about 0.5 m may be chosen in consideration of the physical constraints and energy consumption. The power consumed by the lighting device is proportional to the distance of the surface it needs to project the light onto.

After determining the contour of the surface and the distance between the LEDs and the projected surface, two types of LEDs may be selected in the lighting device 100 of various embodiments, to meet the CCT and intensity requirements of a lighting device capable of reproducing light of CCT between 2,400 K to 10,000 K, and at the same time maintain a consistent illuminance intensity between 0 to 40,000 lx. In an exemplary embodiment, the properties of the two types of LEDs 101, 103 that may be included in the lighting device 100 are shown in Table 1. It is understood that LEDs with properties different from those of Table 1 may also be used in the lighting device 100 to reproduce light of desired CCT and desired illuminance intensity in various embodiments.

TABLE 1

Properties of LEDs for the lighting device

|  | LED 101 | LED 103 |
| --- | --- | --- |
| Power Rating | 3 W | 3 W |
| Color Temperature | 2,400 K | 12,000 K |
| CRI | >80 | >80 |
| Description | Warm white | Cool white |

The warm white LEDs 101 and the cool white LED 103 arranged in the matrix form according to the embodiments of FIG. 1 may generate light with a higher uniformity.

In various embodiments, to overcome slight variations in each LED and to ensure circular projection of light onto the facade surface at a distance of 0.5 m, a lens with 40° emitting angle may be used in the lighting device.

Figure 3:
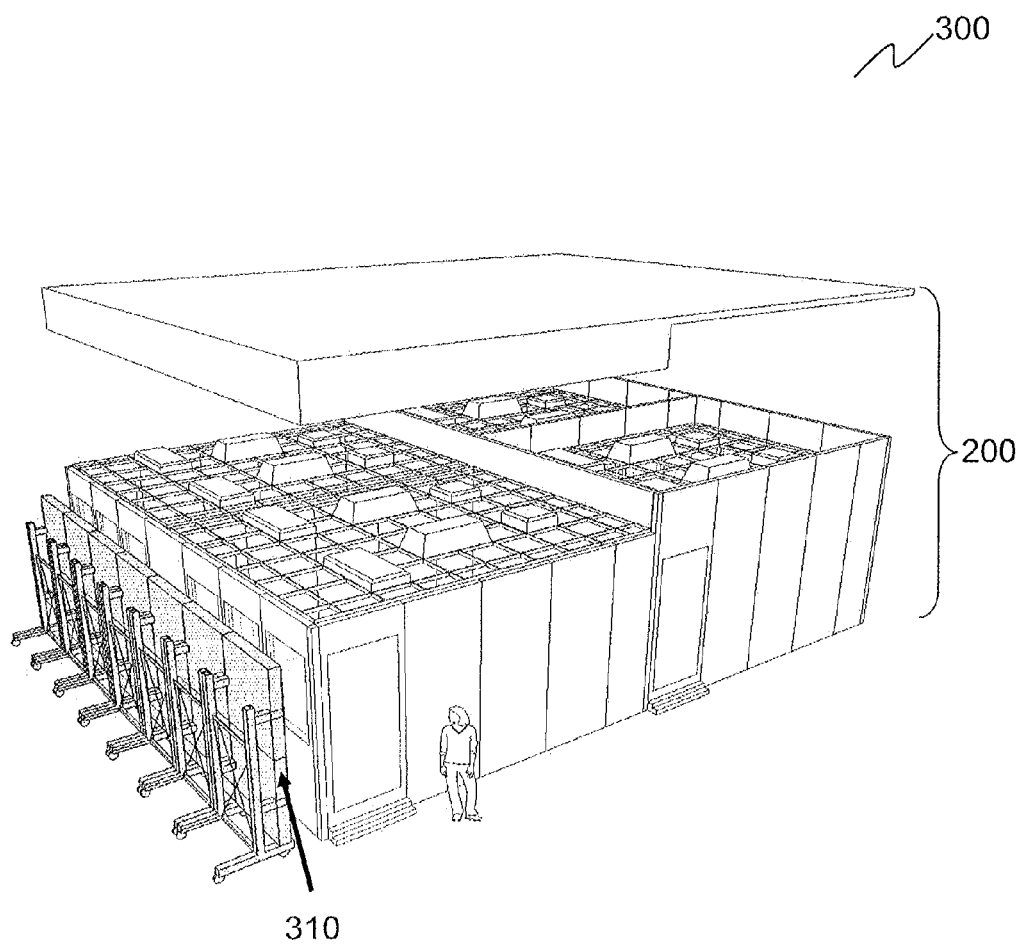
FIG. 3 shows an arrangement wherein a lighting device of various embodiments is applied in an indoor environment.

FIG. 3 shows an arrangement 300 wherein a lighting device 310 of various embodiments is applied in an indoor environment.

The lighting device 100 of FIG. 1 may represent a module of light source. In an exemplary embodiment, each of this module 100 may include 50 cool white (e.g., with the CCT of 12,000 K) LEDs and 50 warm white (e.g., with the CCT of 2,400 K) LEDs capable of having multiple levels of brightness, making a total of 100 LEDs per module. To project emulated daylight to any facade, a plurality of modular light source 100 may be connected and pieced together to produce a larger planar lighting device 310. The lighting device 310 may be arranged with respect to the test bed 200, as shown FIG. 3, to project the emulated daylight to the surface of the test bed 200.

By combining different intensity of each of the two types of LEDs, a spectrum of CCT and intensity may be produced by the lighting device 100, 310. According to the arrangement of LEDs of various embodiments, only two types of LEDs, e.g. warm white LEDs and cool white LEDs, are sufficient to produce the required effects. The arrangement of LEDs according to various embodiments also provide desired uniformity within the illuminated surface, which is a critical criteria in test bedding and architectural designs.

Although FIG. 1 shows the lighting device 100 including 100 LEDs arranged in a 10×10 matrix, it is understood that the lighting device 100 may include various number of LEDs arranged in a matrix of various dimensions in other embodiments. The dimensions of the matrix may be, for example. 1×N, M×1, M×N (M≥2, N≥2) so as to form the lighting device 100 of various size which provides an uniform illumination region of various areas.

Figures 4A, 4B:
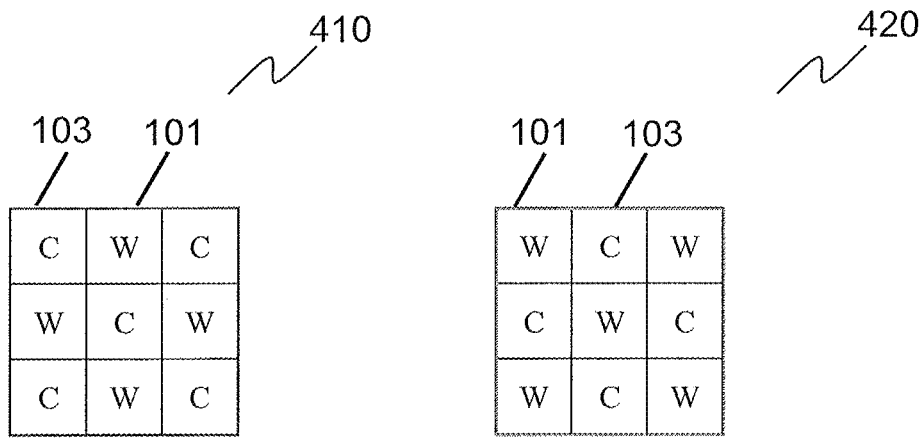
FIGS. 4A and 4B show the arrangement of LEDs in the lighting device according to various embodiments.

In various embodiments, the arrangement of LEDs in the lighting device may be formed from two basic cells 410, 420 including the two types of LEDs 101, 103, as shown in FIG. 4A and FIG. 4B.

Figure 5:
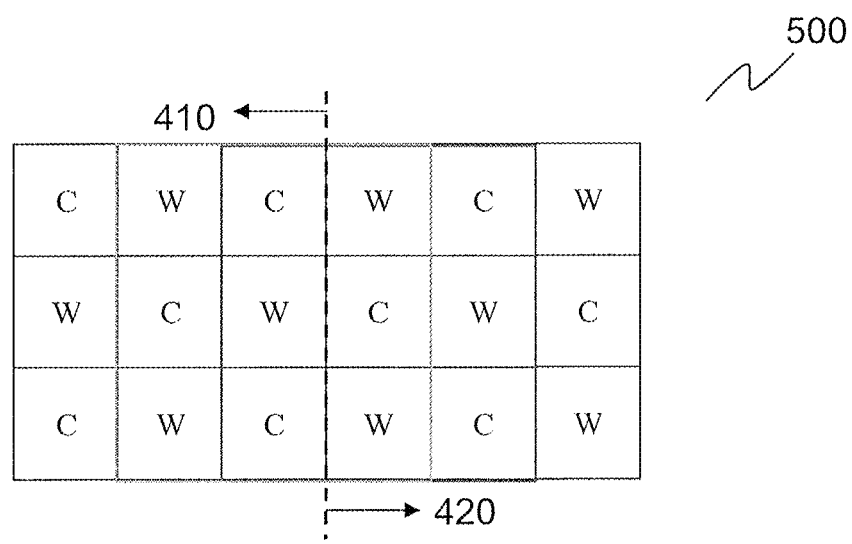
FIG. 5 shows an LED arrangement in a lighting device according to various embodiments.

The first type of basic cell 410 may include a combination of 4 warm white LEDs and 5 cool white LEDs, as in FIG. 4A. The second type of basic cell 420 may include 5 warm white LEDs and 4 cool white LEDs as in FIG. 4B. The unequal number of the two types of LEDs from each cell 410, 420 may seem to produce a unbalanced contribution of warm white and cool white light, however, when these two types of basic cells are combined together as shown in the LED arrangement 500 of FIG. 5, the first type of basic cell 410 reappears 2 columns to the right, and the second type of basic cell 420 reappears 2 columns to the left. In the LED arrangement 500, the number of warm white LEDs is equal to the number of cool white LEDs. It is understood that the number of warm white LEDs may be different from the number of cool white LEDs in other embodiments.

In various embodiments, various number of the first type basic cells 410 and the second type basic cells 420 may be arranged in a matrix of various dimensions to form the lighting device of various embodiments.

When these two types of basic cells of LEDs are scaled up, a uniform superposition of warm white and cool white may be projected onto the required surface, forming the mixed light with a range of CCT between 2,400 K to 10,000 K and a range of illuminance intensity between 0 to 40,000 lx.

Although FIG. 4A and FIG. 4B show two types of basic cells 410, 420 with a 3×3 dimension, it is understood that in various embodiments basic cells of various dimensions, for example, 1×2, 2×1, 2×2, 4×4, etc., may be arranged similarly in a matrix of various dimensions, e.g. 1×N, M×1, M×N (M≥2, N≥2), so as to form the lighting device which provides an uniform illumination region of various areas. In an example of 1×N or M×1 matrix, the uniformity may be provided in one dimension along the longitudinal axis of the matrix.

In order to operate at a distance of 0.5 m with considerations of energy consumption and slight performance variations of each LED, a lens of about 40° may be used to ensure predictability of cone projection of light onto the surface. This angle of 40° allows light to cast in a circular manner for superposition with other light projections at a distance of 0.5 m. Other lens with different emitting angles may also be used similarly for different distance of projections. The emitting angle is inversely proportional to the distance of the light source to the surface of the test bed.

In an embodiment of the lighting device 100, 50 cool white LEDs and 50 warm white LEDs are arranged to provide a grid/matrix of 10 by 10 LEDs, which may form a 30 cm by 30 cm lighting module 100. This module size may be chosen in consideration of physical convenience and power consumption.

Figure 6:
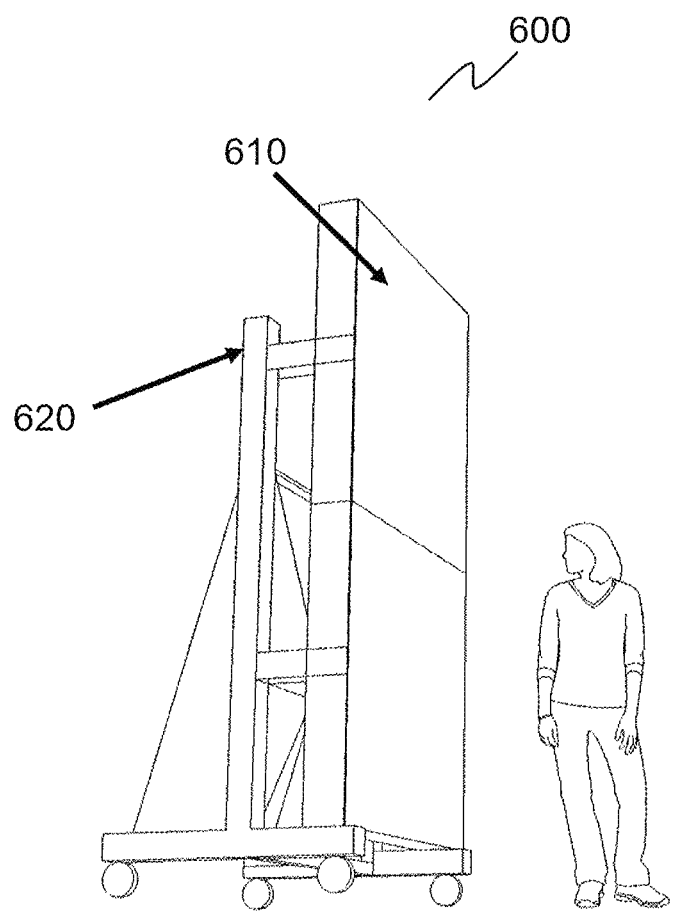
FIG. 6 shows a lighting device including a plurality of the lighting modules of FIG. 1 to form a panel of lighting modules according to various embodiments.

FIG. 6 shows a lighting device 600 including a plurality of the lighting modules 100 to form a panel 610 of lighting modules, which may be used for a test bed with a height of about 3 m. In this exemplary embodiment, 10 of the plurality of the lighting modules 100 may be stacked vertically to form a column to illuminate the surface of the test bed. In the horizontal direction, 3 to 4 modules 100 may be arranged. All these 30 to 40 modules may be mounted onto a frame 620 to form the lighting device 600 of FIG. 6.

To illuminate a full size room of about 4 m in length or width, 4 of such panels 610 may be combined horizontally to provide uniform CCT and intensity illumination on the facade surface or into the room. Further scaling may also be made to combine various number of panels in various embodiments.

According to various embodiments above, a lighting device or a daylight emulator characterized by one or more lighting modules may be provided for producing a wide range of illuminance levels and providing correlated color temperature changing capabilities to emulate daylight with a high level of uniformity. The lighting module includes a plurality of LEDs and lens arranged in a matrix form. The daylight emulator may reproduce the daylight of various natural scenes according to a controlling method or system described in various embodiments below, based on a database of CCT and illuminance of daylight for various natural scenes. The controlling method or system described in various embodiments below allows individual, subgroup, or group control of the lighting modules (e.g. lighting module 100) in the daylight emulator (e.g. lighting device 600).

According to various embodiments above, an arrangement using minimal types of LEDs is provided to form a lighting device for daylight emulation with uniform CCT and intensity. According to various embodiments above, a scalable modular system providing variable sized illumination for small scaled model to full size test bed is also provided.

In the above embodiments to alternately arrange warm white LEDs and cool white LEDs, e.g. as shown in FIGS. 1, 4A, 4B and 5, uniformity can be achieved by superposition of the alternately arranged LEDs. The superposition of alternate LEDs to achieve uniformity is described in detail below.

Figure 7:
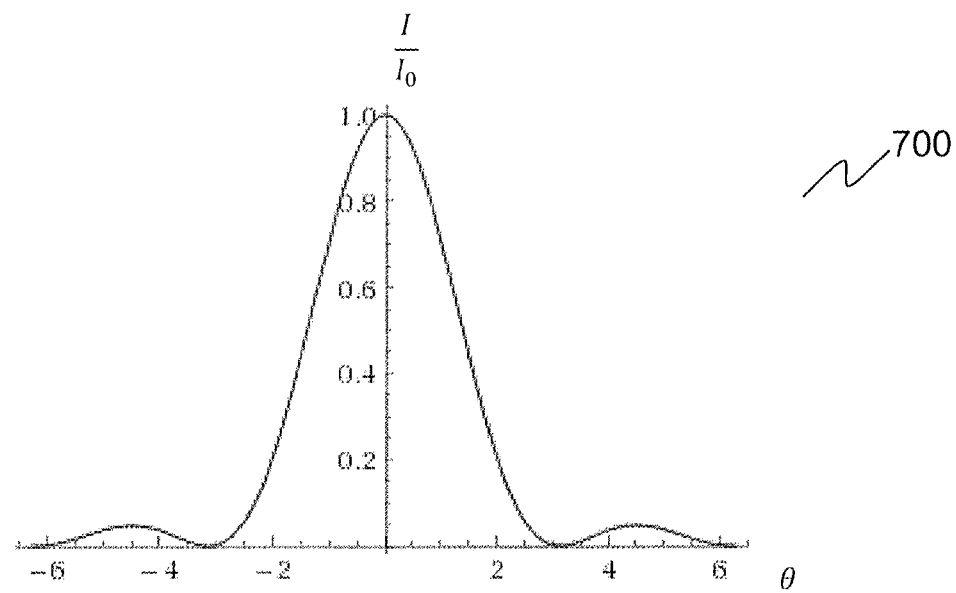
FIG. 7 shows an Airy Pattern according to various embodiments.

According to Fraunhofer diffraction pattern of an Airy pattern of a circular aperture, the intensity at different observation angles is $$I(\theta) = I_0 \left( \frac{2J_1(ka\sin\theta)}{ka\sin\theta} \right)^2$$

where $I_0$ is the maximum intensity when $\theta=0$ rad,
$J_1$ is the first order of Bessel function of the first kind, $$k = \frac{2\pi}{\lambda}$$

is the wavenumber, and
$\alpha$ is the radius of the aperture.
This equation can be further simplified to $$I(\theta) = I_0 \left( \frac{2J_1(x)}{x} \right)^2$$

where $$x = ka\sin\theta$$
$$= \frac{2\pi a}{\lambda} \frac{q}{R}$$
$$= \frac{\pi q}{\lambda N}$$

where q is the radial distance from the optics axis in the focal plane, $$N = \frac{R}{2a}$$

is the f-number of the system, and
R is the observation distance.
When a lens is used and when R=f, wherein f is the focal length of the lens, a normalised Airy Pattern 700 is shown in FIG. 7.

Figure 8:
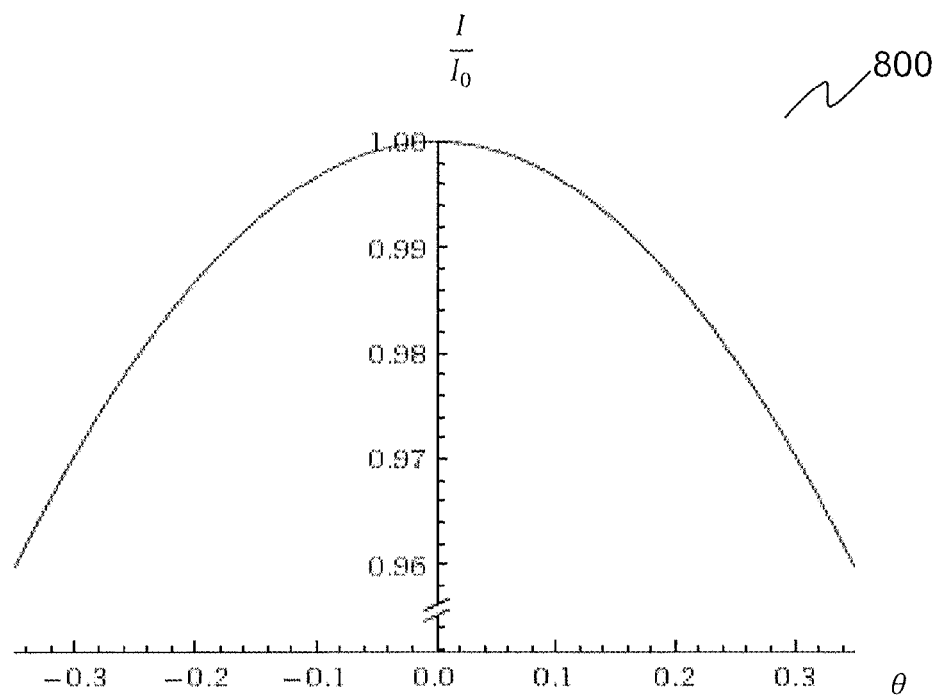
FIG. 8 shows an Airy Pattern from −0.35 rad to 0.35 rad according to various embodiments.

Focusing on the emitting angle of 40° (±20°), the Airy Pattern 800 from −0.35 rad to 0.35 rad is shown in FIG. 8.

Figure 9:
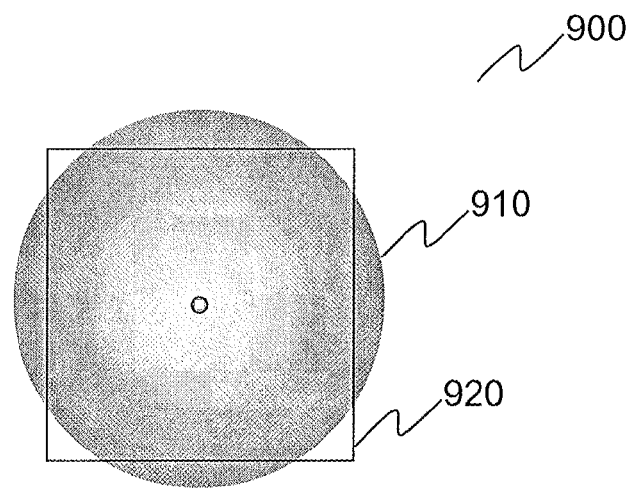
FIG. 9 illustrates an illuminating coverage provided by a central LED according to various embodiments.

Based on a single LED in the center of the lighting module, having an emitting angle of 40° and at a distance of 0.5 m away from the illuminated surface, a coverage illuminating circle 910 with a diameter of 18.2 cm will be provided as shown in FIG. 9. Although the four corners of the rectangular area 920 are not illuminated by the central LED, the coverage would be sufficient as it is already covering more than 80% of the area of the lighting module on the surface.

Figure 10:
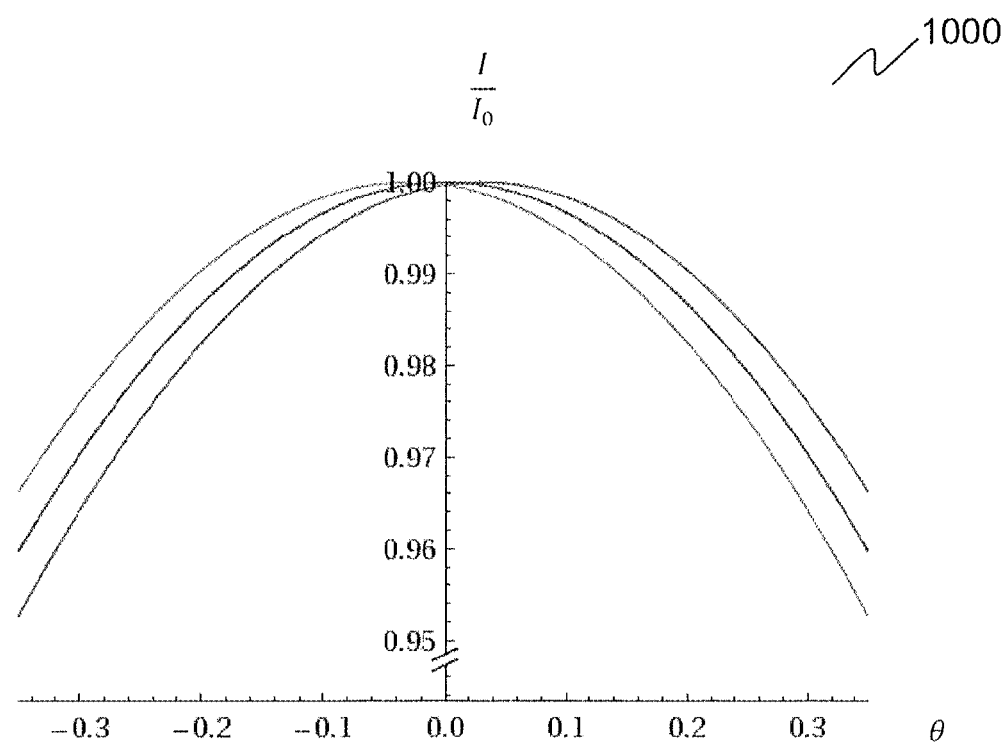
FIG. 10 shows a diagram illustrating the normalized intensity of three LEDs in a row according to various embodiments.
Figure 11:
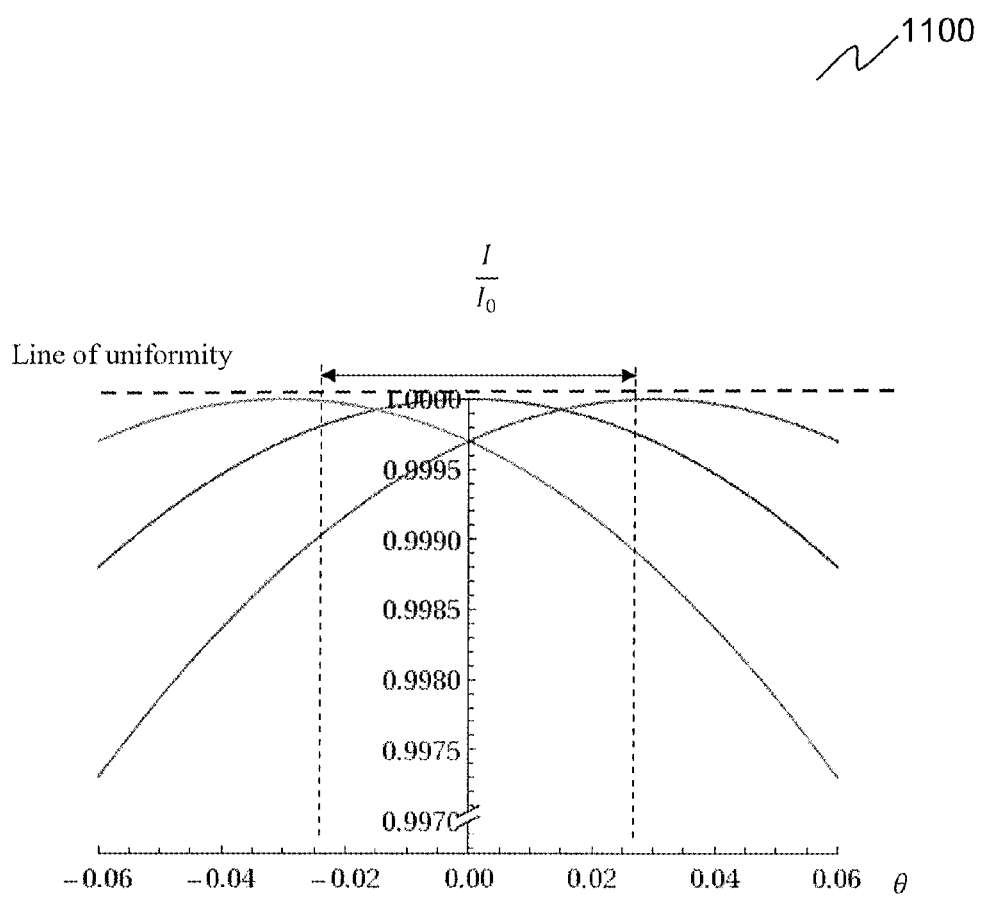
FIG. 11 shows a diagram illustrating an enlarged view of the combined intensity of three LEDs in a row according to various embodiments.

FIG. 10 shows a diagram 1000 illustrating the normalized intensity of three LEDs in a row, and FIG. 11 shows a diagram 1100 illustrating an enlarged view of the combined intensity of three LEDs in a row according to various embodiments.

In FIG. 11, it can be seen that uniformity is achieved from −0.03 rad to 0.03 rad. This is the range of observation angles corresponding to a displacement of 3 cm between the LEDs. When extending a number of LEDs over a plane, a series of circular illumination will superimpose and produce a uniform illumination in terms of CCT and intensity.

Figure 12:
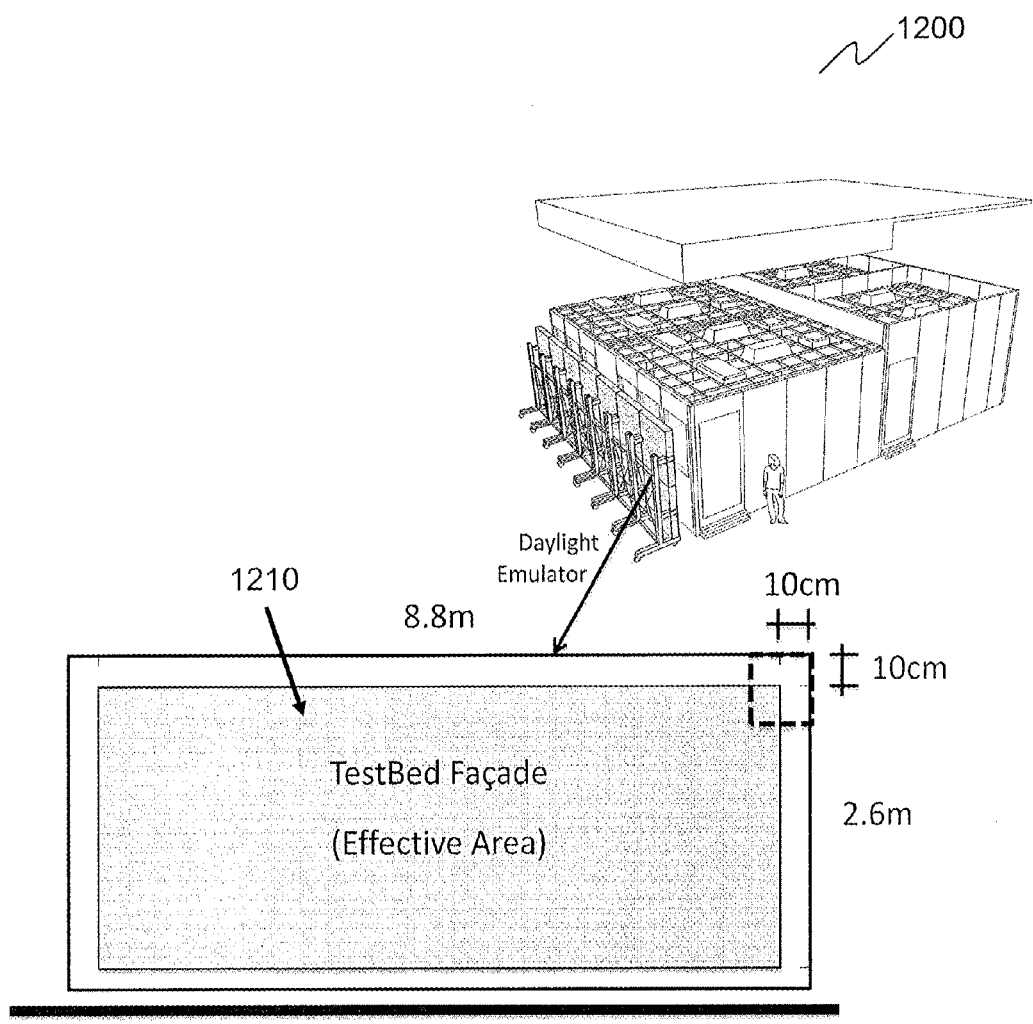
FIG. 12 shows a diagram illustrating an effective area provided by the lighting device of the various embodiments.

With the tessellation nature of the lighting modules, this uniformity can also be achieved when the lighting modules are scaled up to form a panel in a frame, e.g. as in FIG. 6. Frames can be lined up to form a planar surface providing uniform illumination in terms of CCT of 90% and intensity of 80%, as shown in the diagram 1200 of FIG. 12. The daylight emulator of the various embodiments provides a large effective area 1210 as shown in FIG. 12.

The lighting device described in various embodiments above is capable of reproducing both visible spectrum of the sun and its intensity, e.g. according to various natural scenes as shown in Table 2 below. The size of the lighting device may be scalable to provide artificial/man-made daylighting on the indoor test bed according to the four daylight scenarios shown in Table 2. The CCT and illuminance values in Table 2 are examples for illustration purposes, and it is understood that the natural scenes with CCT and illuminance values different from those of Table 2 may also be generated by controlling the LEDs of the lighting device according to the method described in embodiments below.

TABLE 2

Four scenarios of daylight

| | Scenarios | CCT (K) | Illuminance (lx) |
|---|---|---|---|
| 1 | Blue Sky | 10,000 | 40,000 |
| 2 | Cloudy Sky | 7,500 | 20,000 |
| 3 | Midday | 5,500 | 40,000 |
| 4 | Sunrise/Sunset on a clear day | 2,400 | 580 |

Figure 13:
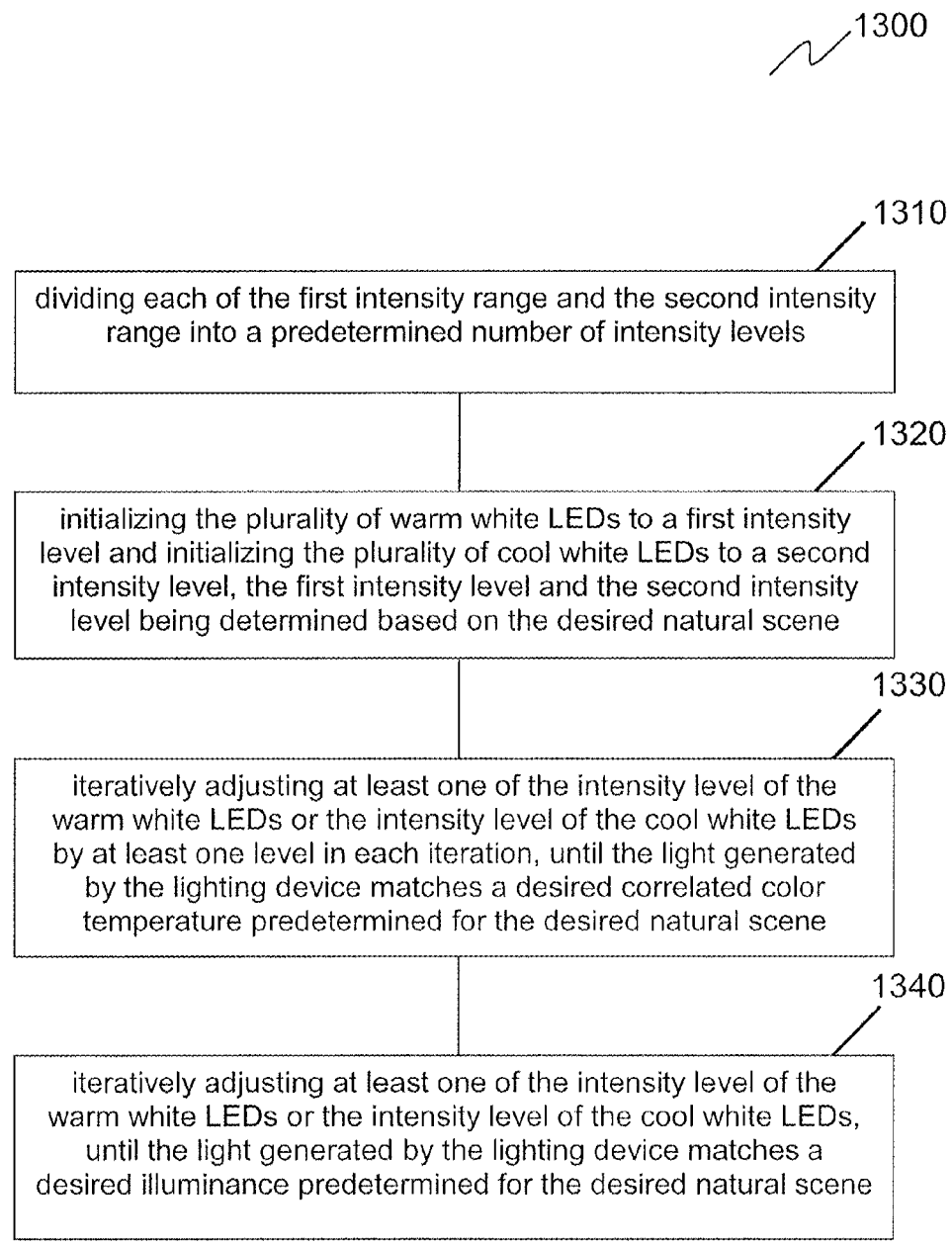
FIG. 13 shows a flowchart illustrating a method for controlling a lighting device to generate light of a desired natural scene according to various embodiments.

FIG. 13 shows a flowchart 1300 illustrating a method for controlling a lighting device to generate light of a desired natural scene according to various embodiments. The lighting device includes a plurality of warm white LEDs having a first intensity range and a plurality of cool white LEDs having a second intensity range.

In various embodiments, the lighting device may be the lighting device 100, 310, 410, 420, 500, 600 described in various embodiments above, in which the warm white LEDs and the cool white LEDs are arranged in a matrix form, and the warm white LED alternates with the cool white LED along each row and each column of the matrix. In various embodiments, the plurality of warm white LEDs may have a correlated color temperature of about 2400K, and the plurality of cool white LEDs may have a correlated color temperature of about 12000K. In various embodiments, the plurality of warm white LEDs and the plurality of cool white LEDs may have other properties or parameters as described in various embodiments above.

At 1310, each of the first intensity range and the second intensity range is divided into a predetermined number of intensity levels.

At 1320, the plurality of warm white LEDs are initialized to a first intensity level and the plurality of cool white LEDs are initialized to a second intensity level, wherein the first intensity level and the second intensity level is determined based on the desired natural scene.

At 1330, at least one of the intensity level of the warm white LEDs or the intensity level of the cool white LEDs are iteratively adjusted by at least one level in each iteration, until the light generated by the lighting device matches a desired correlated color temperature predetermined for the desired natural scene.

At 1340, at least one of the intensity level of the warm white LEDs or the intensity level of the cool white LEDs are iteratively adjusted, until the light generated by the lighting device matches a desired illuminance predetermined for the desired natural scene.

In various embodiments, a range of adjustable intensity levels for the warm white LEDs may be determined based on the desired natural scene, wherein the range is from the first intensity level to a third intensity level. The intensity level of the warm white LEDs is adjusted from the first intensity level towards the third intensity level by at least one level in each iteration, until the light generated by the lighting device matches the desired correlated color temperature predetermined for the desired natural scene.

In further embodiments, if the light generated by the lighting device does not match the desired correlated color temperature when the intensity level of the warm white LEDs is adjusted to the third intensity level, a further range of adjustable intensity levels for the cool white LEDs is determined based on the desired natural scene. The further range is from the second intensity level to a fourth intensity level. The intensity level of the warm white LEDs may be set at the third intensity level. The intensity level of the cool white LEDs may then be adjusted from the second intensity level towards the fourth intensity level by at least one level in each iteration, until the light generated by the lighting device matches the desired correlated color temperature.

In various embodiments, when it is determined that the light generated by the lighting device matches the desired correlated color temperature, the current intensity level of the warm white LEDs and the current intensity level of the cool white LEDs are recorded. In various embodiments, when it is determined that the light generated by the lighting device matches the desired illuminance, the current intensity level of the warm white LEDs and the current intensity level of the cool white LEDs are recorded.

According to various embodiments, when it is determined that the light generated by the lighting device matches the desired correlated color temperature, the intensity level of the warm white LEDs is adjusted by a first number of levels and the intensity level of the cool white LEDs is adjusted by a second number of levels in each iteration, until the light generated by the lighting device matches the desired illuminance predetermined for the desired natural scene. A ratio of the first number to the second number is equal to a ratio of a maximum value of the first intensity range to a maximum value of the second intensity range.

In further embodiments, the desired illuminance is compared with the illuminance of the light generated by the lighting device. If it is determined that the illuminance of the light generated by the lighting device is higher than the desired illuminance, the intensity level of the warm white LEDs is decreased by the first number of levels and the intensity level of the cool white LEDs is decreased by the second number of levels. If it is determined that the illuminance of the light generated by the lighting device is lower than the desired illuminance, the intensity level of the warm white LEDs is increased by the first number of levels and the intensity level of the cool white LEDs is increased by the second number of levels.

In various embodiments, the desired natural scene includes one of a sunset scene, a sunrise scene, a blue sky scene, a cloudy day scene, or a mid-day scene. The method may control the lighting device to generate lights of various natural scenes.

According to various embodiments, if the desired correlated color temperature predetermined for the desired natural scene is equal to a correlated color temperature of the plurality of warm white LEDs, the intensity level of the plurality of warm white LEDs is initialized to a maximum level of the first intensity range, and the intensity level of the plurality of cool white LEDs is initialized to a minimum level of the second intensity range. In an exemplary embodiment, the predetermined number of intensity levels may range from level 0 to level 255. The intensity level of the plurality of warm white LEDs may be initialized to level 255, and the intensity level of the plurality of cool white LEDs may be initialized to level 0. The intensity level of the warm white LEDs may be iteratively decreased by at least one level in each iteration, until the light generated by the lighting device matches the desired illuminance predetermined for the desired natural scene. In various embodiments, the desired natural scene is a sunset scene or a sunrise scene having the desired correlated color temperature of about 2400K and having the desired illuminance of about 580 lx. In various embodiments, the warm white LEDs may have a correlated color temperature of about 2400K, equal to the desired correlated color temperature predetermined for the sunset scene or the sunrise scene.

In various embodiments, the predetermined number of intensity levels may range from level 0 to level 255. In other embodiments, the predetermined number may be other numbers, such as 8, 16, 32, 64, 128, 512, 1024 or other suitable numbers.

According to various embodiments, the desired natural scene is a blue sky scene having the desired correlated color temperature of about 10000K and having the desired illuminance of about 40000 lx. The first intensity level may be determined to be a level corresponding to a minimum intensity of the first intensity range, and the third intensity level may be determined to be a level corresponding to one fourth of a maximum intensity of the first intensity range, thereby forming the range of adjustable intensity levels for the warm white LEDs. The second intensity level may be determined to be a level corresponding to a maximum intensity of the second intensity range, and the fourth intensity level may be determined to be a level corresponding to three fourth of the maximum intensity of the second intensity range, thereby forming the further range of adjustable intensity levels for the cool white LEDs.

In an exemplary embodiment, the predetermined number of intensity levels may range from level 0 to level 255. The intensity level of the warm white LEDs may be initialized to the first intensity level, e.g., level 0, and the intensity level of the cool white LEDs may be initialized to the second intensity level, e.g., level 255. A range of adjustable intensity levels from level 0 to level 64 may be determined for the warm white LEDs. A range of adjustable intensity levels from level 255 to level 192 may be determined for the cool white LEDs. The range of adjustable intensity levels for the warm white LEDs and the cool white LEDs may be predetermined for one or more natural scenes. During the iterative adjustment to generate light matching with the desired CCT or the desired illuminance of the blue sky scene, the intensity level of the warm white LEDs is adjusted from level 0 towards level 64, and the intensity level of the cool white LEDs is adjusted from level 255 towards level 192.

According to various embodiments, the desired natural scene is a cloudy day scene having the desired correlated color temperature of about 7500K and having the desired illuminance of about 20000 lx. The first intensity level may be determined to be a level corresponding to half of a maximum intensity of the first intensity range, and the third intensity level may be determined to be a level corresponding to three eighth of the maximum intensity of the first intensity range, thereby forming the range of adjustable intensity levels for the warm white LEDs, The second intensity level may be determined to be a level corresponding to half of a maximum intensity of the second intensity range, and the fourth intensity level may be determined to be a level corresponding to five eighth of the maximum intensity of the second intensity range, thereby forming the further range of adjustable intensity levels for the cool white LEDs.

In an exemplary embodiment, the predetermined number of intensity levels may range from level 0 to level 255. The intensity levels of the warm white LEDs and the cool white LEDs may be respectively initialized to the first intensity level and the second intensity level, e.g., level 128. A range of adjustable intensity levels from level 128 to level 96 may be determined for the warm white LEDs, and a range of adjustable intensity levels from level 128 to level 160 may be determined for the cool white LEDs. The range of adjustable intensity levels for the warm white LEDs and the cool white LEDs may be predetermined for one or more natural scenes. During the iterative adjustment to generate light matching with the desired CCT or the desired illuminance of the cloudy day scene, the intensity level of the warm white LEDs is adjusted from level 128 towards level 96, and the intensity level of the cool white LEDs is adjusted from level 128 towards level 160.

According to various embodiments, the desired natural scene is a mid-day scene having the desired correlated color temperature of about 5500K and having the desired illuminance of about 40000 lx. The first intensity level may be determined to be a level corresponding to three fourth of a maximum intensity of the first intensity range, and the third intensity level may be determined to be a level corresponding to three eighth of the maximum intensity of the first intensity range, thereby forming the range of adjustable intensity levels for the warm white LEDs. The second intensity level may be determined to be a level corresponding to a minimum intensity of the second intensity range, and the fourth intensity level may be determined to be a level corresponding to half of a maximum intensity of the second intensity range, thereby forming the further range of adjustable intensity levels for the cool white LEDs.

In an exemplary embodiment, the predetermined number of intensity levels may range from level 0 to level 255. The intensity level of the warm white LEDs may be initialized to the first intensity level, e.g., level 192, and the intensity level of the cool white LEDs may be initialized to the second intensity level, e.g., level 0. A range of adjustable intensity levels from level 192 to level 96 may be determined for the warm white LEDs, and a range of adjustable intensity levels from level 0 to level 128 may be determined for the cool white LEDs. The range of adjustable intensity levels for the warm white LEDs and the cool white LEDs may be predetermined for one or more natural scenes. During the iterative adjustment to generate light matching with the desired CCT or the desired illuminance of the mid-day scene, the intensity level of the warm white LEDs is adjusted from level 192 towards level 96, and the intensity level of the cool white LEDs is adjusted from level 0 towards level 128.

In various embodiments, after the lighting device is controlled by adjusting or calibrating the LEDs to generate the light of the desired natural scene as in various embodiments above, at least one of the correlated color temperature or the illuminance of the light generated by the lighting device is periodically or instantaneously monitored. This is, for example, due to the LEDs which may deteriorate over time, and the light generated by the lighting device may thus be changed. If it is monitored that the light generated by the lighting device does not match at least one of the desired correlated color temperature or the desired illuminance, adjustment of at least one of the intensity level of the warm white LEDs or the intensity level of the cool white LEDs as described in various embodiments above may be repeated. In various embodiments, the method of controlling the lighting device as described in various embodiments above may be repeated periodically without monitoring the status of the light generated by the lighting device. For example, the adjustment or calibration of LEDs of the lighting device above may be repeated about every 2000 hours of operation of the lighting device.

Exemplary embodiments of the method for controlling the lighting device to generate light of various natural scenes, for example, the four scenes in Table 2, are described in more detail with reference to FIGS. 14 to 18.

In the examples below, there are 256 intensity levels for each type of the LEDs. As each type of LED has a different maximum intensity, the level for each LED would be different. In an exemplary embodiment, the first intensity range (e.g. luminous intensity range) for the warm white LEDs may be from 0 cd to 36855 cd, and the second intensity range (e.g. luminous intensity range) for the cool white LEDs may be from 0 cd to 29666 cd. Accordingly, the intensity per level for the warm white LEDs is about 144 cd, and the intensity per level for the cool white LEDs is about 116 cd. It is understood that these values for the various parameters are examples for illustration purposes, and various other suitable values may be used for the number of intensity levels, the first intensity range and the second intensity range in various embodiments.

The method of various embodiments to tune the LEDs requires some steps to ensure repeatability and accuracy. The settings of the LEDs are tuned according to the following methods to achieve the desired CCT and illuminance intensity.

Figure 14:
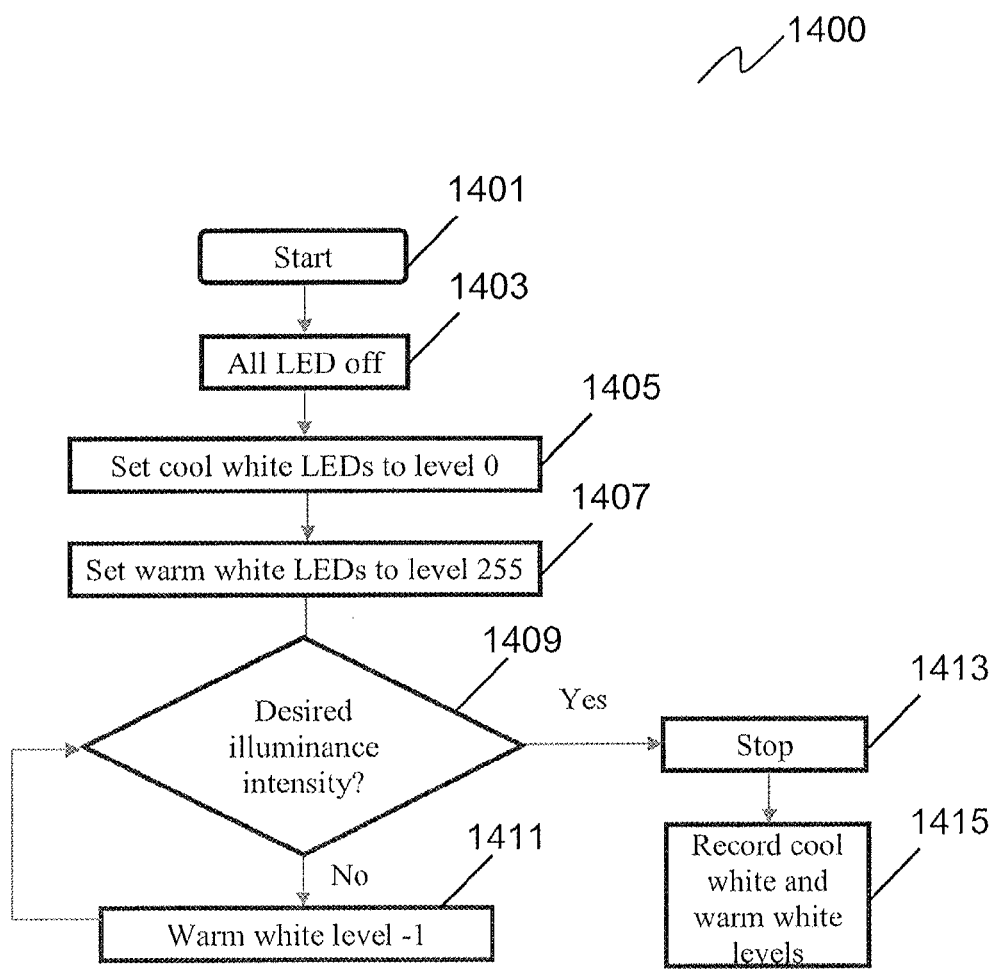
FIG. 14 shows a flowchart illustrating a method for controlling the lighting device to generate light of a sunset or sunrise scene according to various embodiments.

In FIG. 14, a flowchart 1400 illustrating a method for controlling the lighting device to generate light of a sunset or sunrise scene is shown. The desired CCT for the sunset/sunrise scene may be determined to be 2400 K, which is the same as the CCT of the warm white LEDs. Accordingly, the intensity level of the cool white LEDs may be initialized to level 0, and the intensity level of the warm white LEDs may be initialized to the maximal level 255. To match the desired illuminance of 580 lx, the intensity level of the warm white LED is reduced level by level, until the desired illuminance intensity is reached.

As shown in FIG. 14, upon start at 1401, all LEDs are switched off at 1403. The cool white LEDs are set to level 0 at 1405, and the warm white LEDs are set to level 255 at 1407. It is then determined whether the desired illuminance intensity has been achieved in the generated light at 1409. If no, the intensity level of the warm white LEDs are decreased by one level at 1411, and the method returns to 1409 to determine whether the desired illuminance intensity has been achieved. If yes, the method stops at 1413, and the current warm white levels and cool white levels are recorded at 1415.

Figure 15:
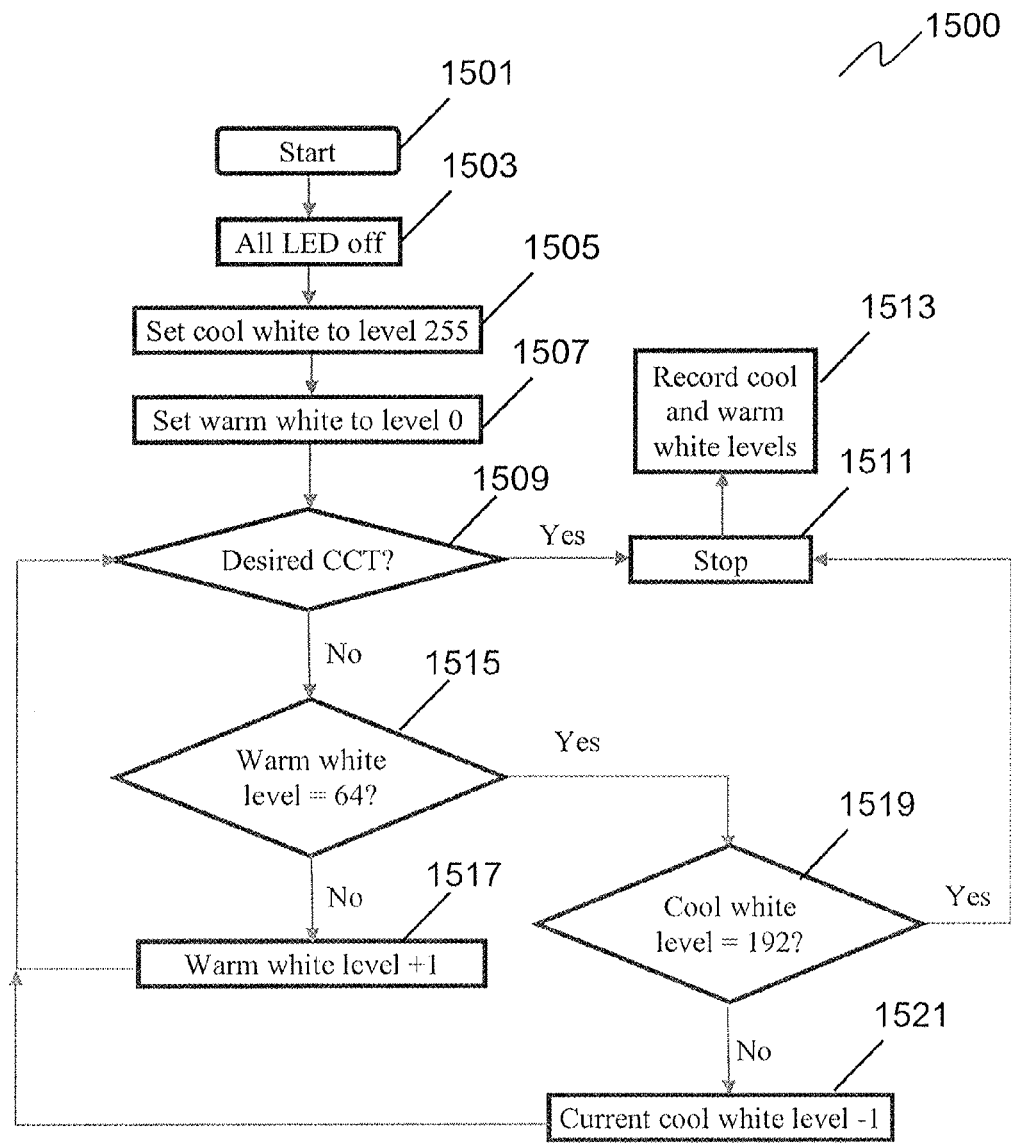
FIG. 15 shows a flowchart illustrating a method for controlling the lighting device to generate light of a blue sky scene according to various embodiments.

In FIG. 15, a method for controlling the lighting device to generate light of a blue sky scene is illustrated in a flowchart 1500. The color temperature for the blue sky setting is 10,000K which has more cool white component than warm white component. Accordingly, the range of adjustable intensity levels for the warm white LEDs is determined to range from level 0 to 64, and the range of adjustable intensity levels for the cool white LED is determined to range from level 192 to level 256. In this manner, it is not necessary to adjust or tune the warm white and cool white LEDs in their entire intensity range to find the mixed resulting light of 10,000 K.

As shown in FIG. 15, upon start at 1501, all LEDs are switched off at 1503. The cool white LEDs are set to level 255 at 1505, and the warm white LEDs are set to level 0 at 1507. It is then determined whether the desired CCT has been achieved in the generated light at 1509. If yes, the method stops at 1511, and the current warm white levels and cool white levels are recorded at 1513. If not, it is determined whether the intensity level of the warm white LEDs is equal to level 64 at 1515. If the intensity level of the warm white LEDs is not equal to level 64, the intensity level of the warm white LEDs is increased by one level at 1517, and the method returns to 1509 to determine whether the desired CCT has been achieved. It not, step 1515 and/or step 1517 will be repeated until the desired CCT has been achieved.

If the desired CCT has not been achieved when the intensity level of the warm white LEDs is increased to level 64, it will be determined whether the intensity level of the cool white LEDs is equal to level 192 at 1519. If not, the intensity level of the cool white LEDs is decreased by one level at 1521, and the method returns to 1509 to determine whether the desired CCT has been achieved. It the desired CCT has not been achieved, steps 1515, 1519 and 1521 will be repeated until the desired CCT has been achieved. The minimum intensity level of the cool white LEDs is level 192.

Figure 16:
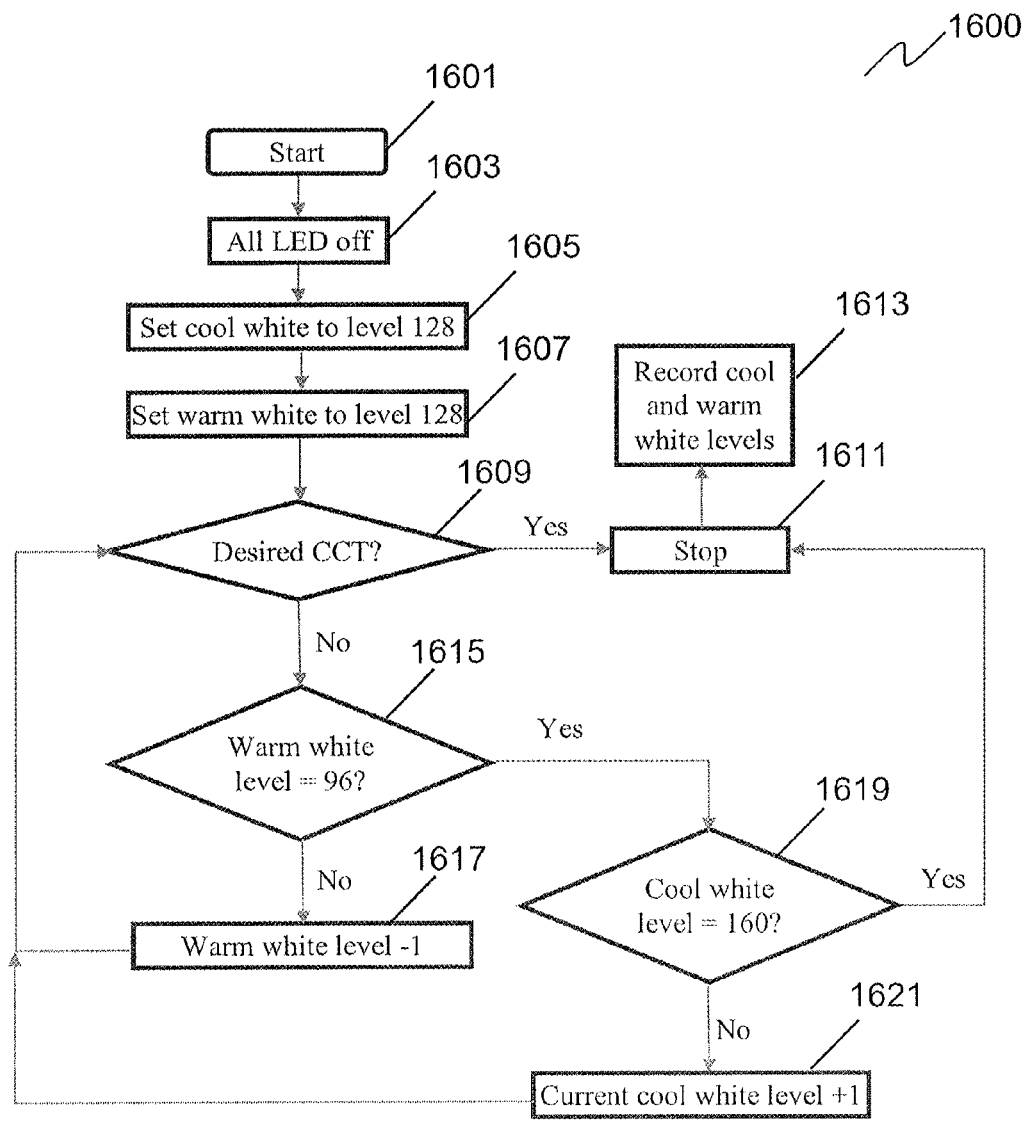
FIG. 16 shows a flowchart illustrating a method for controlling the lighting device to generate light of a cloudy day scene according to various embodiments.

In FIG. 16, a method for controlling the lighting device to generate light of a cloudy day scene is illustrated in a flowchart 1600. As the color temperature of cloudy day is 7,500 K, the warm white and cool white components are about the same. Therefore, the levels for cool white and warm white LEDs start off from level 128. As 7,500 K is more towards cool white, the warm white level is decreased while the cool white is increased to tune to the required color temperature. However, the level for the warm white LEDs may not be less than 96, and the level for the cool white LEDs may not be more than 160 for the cloudy day scene. Accordingly, the range of adjustable intensity levels for the warm white LEDs is determined to range from level 128 to 96, and the range of adjustable intensity levels for the cool white LED is determined to range from level 128 to level 160.

As shown in FIG. 16, upon start at 1601, all LEDs are switched off at 1603. The cool white LEDs are set to level 128 at 1605, and the warm white LEDs are set to level 128 at 1607. It is then determined whether the desired CCT has been achieved in the generated light at 1609. If yes, the method stops at 1611, and the current warm white levels and cool white levels are recorded at 1613. If not, it is determined whether the intensity level of the warm white LEDs is equal to level 96 at 1615. If the intensity level of the warm white LEDs is not equal to level 96, the intensity level of the warm white LEDs is decreased by one level at 1617, and the method returns to 1609 to determine whether the desired CCT has been achieved. It not, step 1615 and/or step 1617 will be repeated until the desired CCT has been achieved.

If the desired CCT has not been achieved when the intensity level of the warm white LEDs is decreased to level 96, it will be determined whether the intensity level of the cool white LEDs is equal to level 160 at 1619. If not, the intensity level of the cool white LEDs is increased by one level at 1621, and the method returns to 1609 to determine whether the desired CCT has been achieved. It the desired CCT has not been achieved, steps 1615, 1619 and 1621 will be repeated until the desired CCT has been achieved. The maximum intensity level of the cool white LEDs is level 160.

Figure 17:
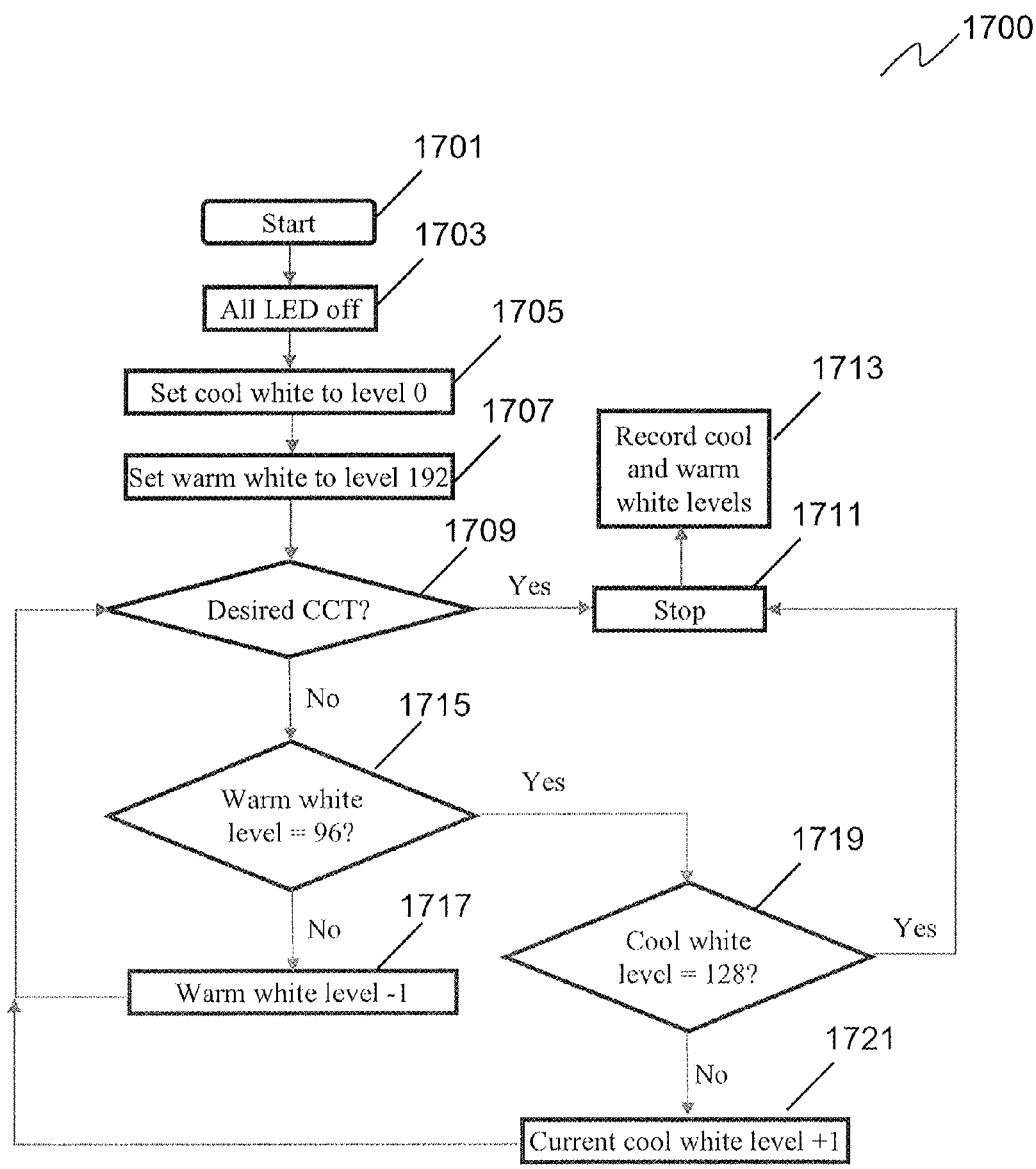
FIG. 17 shows a flowchart illustrating a method for controlling the lighting device to generate light of a mid-day scene according to various embodiments.

In FIG. 17, a method for controlling the lighting device to generate light of a mid-day scene is illustrated in a flowchart 1700. For mid-day scene, there are more warm white component than cool white component, and thus the level for warm white is higher than that of cool white. Accordingly, the range of adjustable intensity levels for the warm white LEDs is determined to range from level 96 to level 192, and the range of adjustable intensity levels for the cool white LED is determined to range from level 0 to level 128.

As shown in FIG. 17, upon start at 1701, all LEDs are switched off at 1703. The cool white LEDs are set to level 0 at 1705, and the warm white LEDs are set to level 192 at 1707. It is then determined whether the desired CCT has been achieved in the generated light at 1709. If yes, the method stops at 1711, and the current warm white levels and cool white levels are recorded at 1713. If not, it is determined whether the intensity level of the warm white LEDs is equal to level 96 at 1715. If the intensity level of the warm white LEDs is not equal to level 96, the intensity level of the warm white LEDs is decreased by one level at 1717, and the method returns to 1709 to determine whether the desired CCT has been achieved. It not, step 1715 and/or step 1717 will be repeated until the desired CCT has been achieved.

If the desired CCT has not been achieved when the intensity level of the warm white LEDs is decreased to level 96, it will be determined whether the intensity level of the cool white LEDs is equal to level 128 at 1719. If not, the intensity level of the cool white LEDs is increased by one level at 1721, and the method returns to 1709 to determine whether the desired CCT has been achieved. It the desired CCT has not been achieved, steps 1715, 1719 and 1721 will be repeated until the desired CCT has been achieved. The maximum intensity level of the cool white LEDs is level 128.

In the embodiments of FIGS. 15-17, if the desired CCT is not achieved when the warm white level and the cool white level have been adjusted to their minimum or maximum levels, the method may then stop and may resume after a predetermined time period, since the LEDs may deteriorate and their intensity level may then be further adjusted to achieve the desired CCT.

FIGS. 15-17 illustrate the exemplary embodiments that the intensity level of the warm white LEDs is adjusted first, followed by the adjustment of the cool white LEDs. In other embodiments of FIGS. 15-17, the intensity level of the cool white LEDs may be adjusted first, followed by the adjustment of the warm white LEDs. In further embodiments, the intensity levels of the warm white LEDs and the cool white LEDs may be adjusted simultaneously in each iteration.

In the sunset/sunrise scene of FIG. 14, the desired CCT matches the color temperature of the warm white LEDs, and accordingly the intensity levels of the warm white LEDs is adjusted to acquire the desired illuminance intensity. For other scenes of FIGS. 15-17, the intensity levels of the warm white LEDs and cool white LEDs may need to be further adjusted to acquire the desired illuminance intensity after the desired CCT has been achieved.

As each type of LED has different maximum intensity given the same 256 levels, the intensity of each level is different. Therefore, when the color temperature has been set, the intensity tuning/adjustment may be carried out according to the ratio of the maximum intensity values of the warm white and cool white LEDs so that the color temperature will be kept and would not be affected by the further adjustment. In this example, the ratio is determined to be 5:4 for warm white to cool white LEDs, since the maximum luminous intensity for the warm white LEDs is selected to be 36855 cd, and the maximum luminous intensity for the cool white LEDs is selected to be 29666 cd. The further intensity tuning of the warm white LEDs and cool white LEDs is performed according to this ratio.

Figure 18:
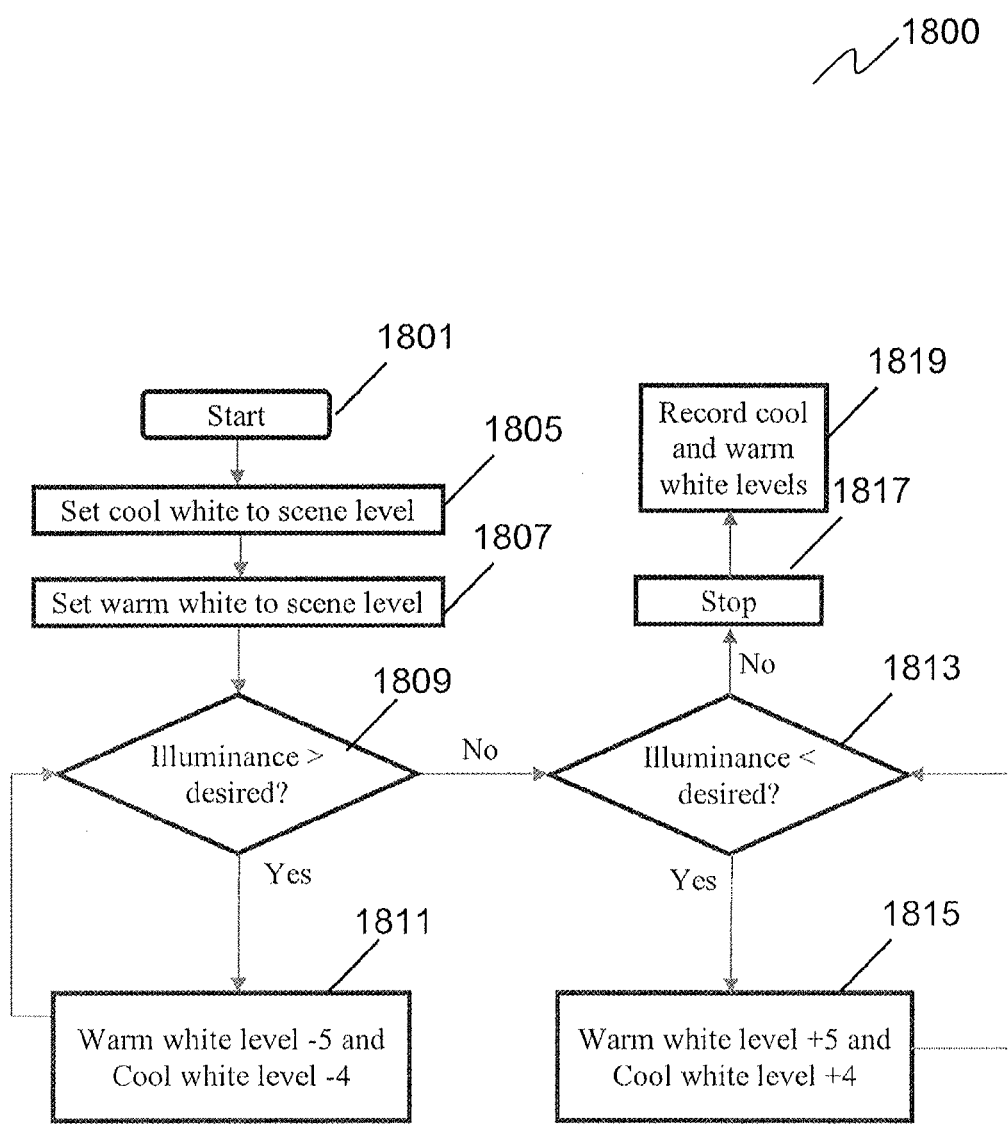
FIG. 18 shows a flowchart illustrating a method for controlling the lighting device to generate light of a desired illuminance according to various embodiments.

FIG. 18 shows a flowchart 1800 illustrating a method for controlling the lighting device to generate light of a desired illuminance according to various embodiments, for example, after the desired CCT has been achieved according to the embodiments of FIGS. 15-17.

As shown in FIG. 18, upon start at 1801, the cool white LEDs are set to the respective scene level at 1805, and the warm white LEDs are set to the respective scene level at 1807. The respective scene level may be the finally recorded cool white level and warm white level for the respective scene of FIGS. 15-17. In other words, the further adjustment of intensity levels to achieve the desired illuminance is starting from the above determined intensity levels which have achieved the desired CCT.

It is then determined whether the current illuminance of the generated light is higher than the desired illuminance. If yes, the intensity level of the warm white LEDs is decreased by 5 levels and the intensity level of the cool white LEDs is decreased by 4 levels at 1811, according to the above determined ratio of 5:4. If the current illuminance of the generated light is not higher than the desired illuminance, it is then determined whether the current illuminance of the generated light is lower than the desired illuminance at 1813. If not, the method stops at 1817, and the current warm white levels and cool white levels are recorded at 1819. If the current illuminance of the generated light is lower than the desired illuminance, the intensity level of the warm white LEDs is increased by 5 levels and the intensity level of the cool white LEDs is increased by 4 levels at 1815. According to the method of FIG. 18, the illuminance of the desired scene may be achieved.

Although the intensity level of the warm white LEDs is adjusted by 5 levels and the intensity level of the cool white LEDs is adjusted by 4 levels in each iteration, it is understood that other number of levels may be adjusted in each iteration, as long as the intensity levels for the warm white and cool white LEDs are adjusted proportionally according to the predetermined ratio described above.

Various embodiments further provide a lighting control system for controlling a lighting device to generate light of a desired natural scene. The lighting device may be a lighting device of various embodiments described above, including a plurality of warm white LEDs having a first intensity range and a plurality of cool white LEDs having a second intensity range. The warm white LEDs and the cool white LEDs may be arranged alternately in a matrix form according to various embodiments above.

Figure 19:
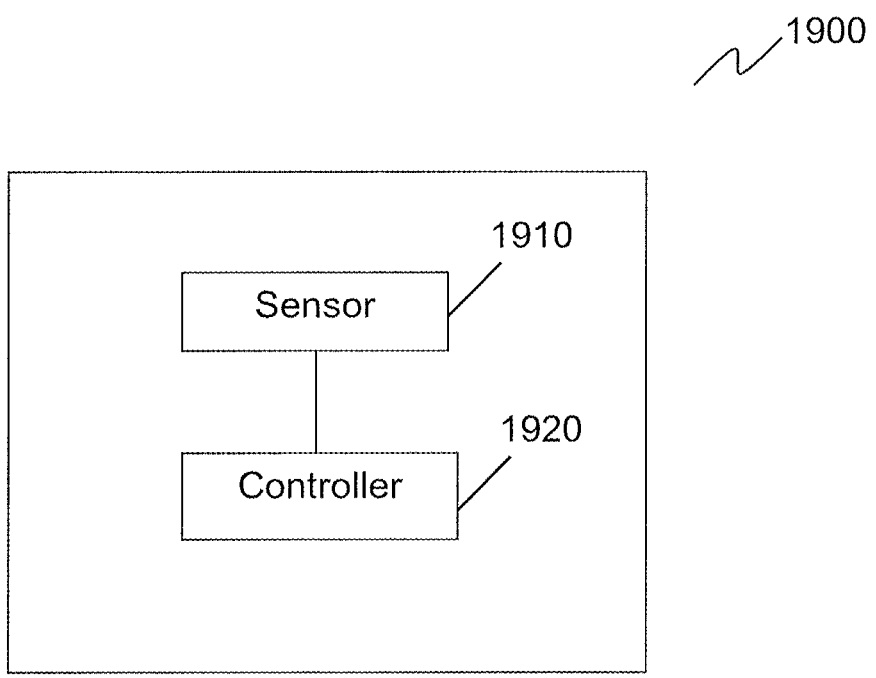
FIG. 19 shows a schematic diagram illustrating a lighting control system according to various embodiments.

FIG. 19 shows the lighting control system 1900 according to various embodiments.

The lighting control system 1900 may include at least one sensor 1910 configured to detect at least one of a correlated color temperature or an illuminance of the light generated by the lighting device.

The lighting control system 1900 may further include at least one controller 1920 configured to control the lighting device according to the controlling method of various embodiments above. The controlling method described in various embodiments above is analogously valid for the controller, and vice versa.

The at least one controller 1920 may be configured to divide each of the first intensity range and the second intensity range into a predetermined number of intensity levels; and to initialize the plurality of warm white LEDs to a first intensity level and initialize the plurality of cool white LEDs to a second intensity level. The at least one controller 1920 may determine the first intensity level and the second intensity level based on the desired natural scene, for example, as described in FIGS. 14-17 above.

The at least one controller 1920 may be configured to iteratively adjust at least one of the intensity level of the warm white LEDs or the intensity level of the cool white LEDs by at least one level in each iteration, until the light generated by the lighting device matches a desired correlated color temperature predetermined for the desired natural scene. For example, the intensity level of the warm white LEDs may be adjusted, followed by the adjustment of the cool white LEDs as in the embodiments of FIGS. 15-17, until the light of the desired CCT is generated.

The at least one controller 1920 may be further configured to iteratively adjust at least one of the intensity level of the warm white LEDs or the intensity level of the cool white LEDs, until the light generated by the lighting device matches a desired illuminance predetermined for the desired natural scene. For example, at least one of the intensity level of the warm white LEDs or the intensity level of the cool white LEDs may be adjusted according to the embodiments of FIGS. 14-17.

Analogue controlling method and system uses variable input voltages and current to control the intensity of the light sources. The analogue method and system may not be suitable for a larger scale lighting device, as voltage and current signals suffer from degradation and noise susceptibility over long distances.

In various embodiments, the lighting control system 1900 may be a digital lighting control system, e.g. one of a DMX512 (Digital Multiplex) system, a DALI (Digital Addressable Lighting Interface) based system, a DSI (Digital Serial Interface) based system, a KNX based system, or any other suitable digital lighting control system. The digital lighting control system of various embodiments may be used to control a large scale lighting device.

Figure 20:
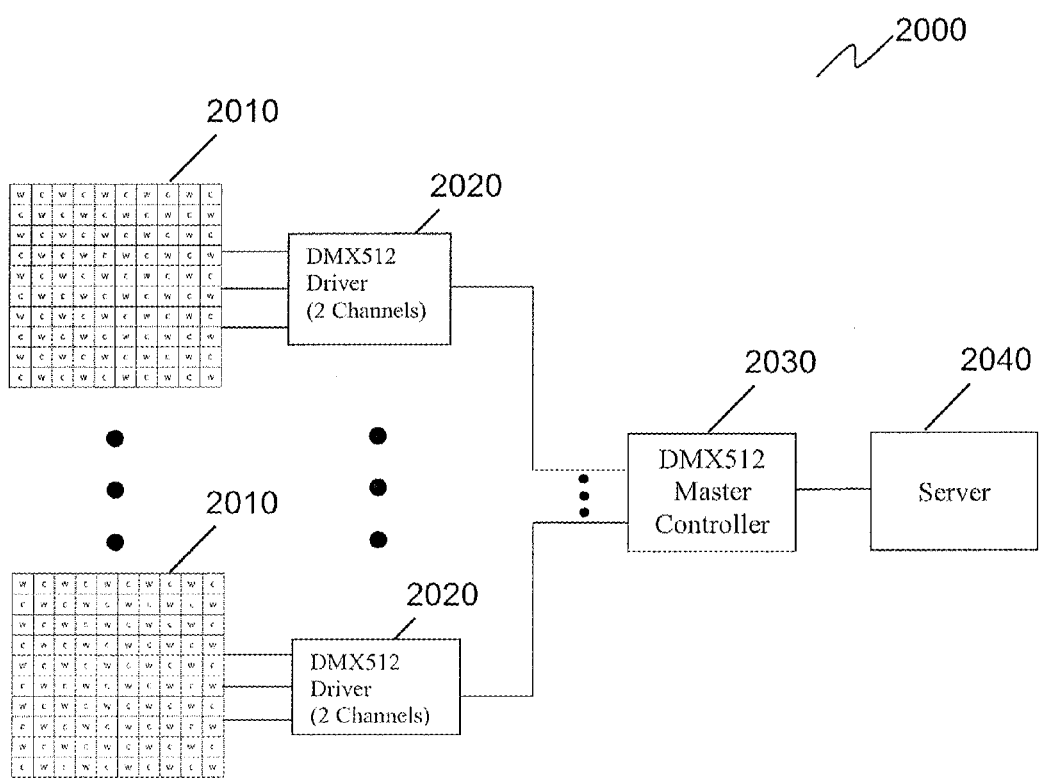
FIG. 20 shows a schematic diagram illustrating a digital lighting control system according to various embodiments.

FIG. 20 illustrates a DMX512 lighting control system 2000 according to various embodiments.

In this embodiment, DMX512 is used to control the lighting device. This digital protocol typically used for stage lighting is suitable for the lighting device of various embodiments, as it is designed for stage lighting over an extended area. With the large size of the lighting device, e.g. in a panel 310 of 3 m in height and 10 m in width as shown in FIG. 3, DMX512 is sufficient for control without suffering from long distance signal attenuation and noise interference. In the embodiments of FIG. 20, a plurality of lighting modules 2010 may be combined in a panel to form the larger size lighting device, where in each lighting module 2010 may be the lighting device 100, 500 described in FIGS. 1 and 5 above.

Another advantage of DMX512 is the individual addressability of the LED drivers. In the lighting control system 2000, each LED of the various lighting modules 2010 may be controlled individually. In various embodiments, each lighting module 2010 may be connected to two channels of a DMX512 driver 2020. One driver channel may be used to control all warm white LEDs, while another driver channel would be used to control all cool white LEDs in the lighting module 2010. In another embodiment, two DMX512 drivers each having one channel may be connected to each lighting module 2010, such that one driver is configured to control all warm white LEDs and the other driver is configured to all cool white LEDs. With this arrangement, each lighting module 2010 may be independently controlled to reproduce the entire desired CCT range from 2,400 K to 10,000 K while maintaining the designed illuminance intensity of 0 to 40,000 lx.

The lighting control system 2000 may include a DMX512 master controller 2030 configured to control the plurality of DMX512 driver 2020, a server 2040 connected to the DMX512 master controller 2030.

In an exemplary embodiments, 50 cool white LEDs and 50 warm white LEDs are arranged to provide a grid/matrix of 10 by 10 LEDs in the lighting module 2010, which may form a 30 cm by 30 cm lighting module. With each LED consuming a maximum of 3 W of power, a lighting module of 100 LEDs may consume a maximum of 300 W. This amount of power is about the combined output power of two DMX512 drivers with one channel each, or the power of a single DMX512 driver with more than one channel.

Having each module 2010 driven by its own set of DMX512 driver 2020, a single lighting module can be controlled independently. In other embodiments, two or more lighting modules may be combined, as the master controller 2030 may operate up to 512 devices.

The lighting device, lighting control method and lighting control system described in various embodiments above have potential applications in research labs, product development (e.g., car, consumer electronics, etc), specified space (e.g., underground, aircraft), task lamp patch (e.g. 30 cm×30 cm) for desktop, alarm (audio and visual), etc.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for controlling a lighting device to generate light of a desired natural scene, the lighting device comprising a plurality of warm white LEDs having a first intensity range and a plurality of cool white LEDs having a second intensity range, the method comprising:
   dividing each of the first intensity range and the second intensity range into a predetermined number of intensity levels;
   initializing the plurality of warm white LEDs to a first intensity level and initializing the plurality of cool white LEDs to a second intensity level, the first intensity level and the second intensity level being determined based on the desired natural scene;
   iteratively adjusting at least one of the intensity level of the warm white LEDs or the intensity level of the cool white LEDs by at least one level in each iteration, until the light generated by the lighting device matches a desired correlated color temperature predetermined for the desired natural scene; and
   iteratively adjusting at least one of the intensity level of the warm white LEDs or the intensity level of the cool white LEDs, until the light generated by the lighting device matches a desired illuminance predetermined for the desired natural scene.

2. The method of claim 1, further comprising:
   determining a range of adjustable intensity levels for the warm white LEDs based on the desired natural scene, the range being from the first intensity level to a third intensity level, and
   iteratively adjusting the intensity level of the warm white LEDs from the first intensity level towards the third intensity level by at least one level in each iteration, until the light generated by the lighting device matches the desired correlated color temperature predetermined for the desired natural scene.

3. The method of claim 2, further comprising:
   if the light generated by the lighting device does not match the desired correlated color temperature when the intensity level of the warm white LEDs is adjusted to the third intensity level,
   determining a further range of adjustable intensity levels for the cool white LEDs based on the desired natural scene, the further range being from the second intensity level to a fourth intensity level, and
   iteratively adjusting the intensity level of the cool white LEDs from the second intensity level towards the fourth intensity level by at least one level in each iteration, until the light generated by the lighting device matches the desired correlated color temperature.

4. The method of claim 3, wherein the desired natural scene is a blue sky scene having the desired correlated color temperature of about 10000K and having the desired illuminance of about 40000 lx.

5. The method of claim 4, comprising:
   determining the first intensity level to be a level corresponding to a minimum intensity of the first intensity range,
   determining the third intensity level to be a level corresponding to one fourth of a maximum intensity of the first intensity range, thereby forming the range of adjustable intensity levels for the warm white LEDs,
   determining the second intensity level to be a level corresponding to a maximum intensity of the second intensity range,
   determining the fourth intensity level to be a level corresponding to three fourth of the maximum intensity of the second intensity range, thereby forming the further range of adjustable intensity levels for the cool white LEDs.

6. The method of claim 3, wherein the desired natural scene is a cloudy day scene having the desired correlated color temperature of about 7500K and having the desired illuminance of about 20000 lx.

7. The method of claim 6, comprising:
determining the first intensity level to be a level corresponding to half of a maximum intensity of the first intensity range,
determining the third intensity level to be a level corresponding to three eighth of the maximum intensity of the first intensity range, thereby forming the range of adjustable intensity levels for the warm white LEDs,
determining the second intensity level to be a level corresponding to half of a maximum intensity of the second intensity range,
determining the fourth intensity level to be a level corresponding to five eighth of the maximum intensity of the second intensity range, thereby forming the further range of adjustable intensity levels for the cool white LEDs.

8. The method of claim 3, wherein the desired natural scene is a mid-day scene having the desired correlated color temperature of about 5500K and having the desired illuminance of about 40000 lx.

9. The method of claim 8, comprising:
determining the first intensity level to be a level corresponding to three fourth of a maximum intensity of the first intensity range,
determining the third intensity level to be a level corresponding to three eighth of the maximum intensity of the first intensity range, thereby forming the range of adjustable intensity levels for the warm white LEDs,
determining the second intensity level to be a level corresponding to a minimum intensity of the second intensity range,
determining the fourth intensity level to be a level corresponding to half of a maximum intensity of the second intensity range, thereby forming the further range of adjustable intensity levels for the cool white LEDs.

10. The method of claim 1, further comprising:
when it is determined that the light generated by the lighting device matches at least one of the desired correlated color temperature or the desired illuminance, recording the current intensity level of the warm white LEDs and the current intensity level of the cool white LEDs.

11. The method of claim 1, further comprising:
when it is determined that the light generated by the lighting device matches the desired correlated color temperature,
adjusting the intensity level of the warm white LEDs by a first number of levels and adjusting the intensity level of the cool white LEDs by a second number of levels in each iteration, until the light generated by the lighting device matches the desired illuminance predetermined for the desired natural scene;
wherein a ratio of the first number to the second number is equal to a ratio of a maximum value of the first intensity range to a maximum value of the second intensity range.

12. The method of claim 11, further comprising:
comparing the desired illuminance with the illuminance of the light generated by the lighting device;
if it is determined that the illuminance of the light generated by the lighting device is higher than the desired illuminance, decreasing the intensity level of the warm white LEDs by the first number of levels and decreasing the intensity level of the cool white LEDs by the second number of levels, or
if it is determined that the illuminance of the light generated by the lighting device is lower than the desired illuminance, increasing the intensity level of the warm white LEDs by the first number of levels and increasing the intensity level of the cool white LEDs by the second number of levels.

13. The method of claim 1, wherein the desired natural scene comprises one of a sunset scene, a sunrise scene, a blue sky scene, a cloudy day scene, or a mid-day scene.

14. The method of claim 1, further comprising:
if the desired correlated color temperature predetermined for the desired natural scene is equal to a correlated color temperature of the plurality of warm white LEDs,
initializing the intensity level of the plurality of warm white LEDs to a maximum level of the first intensity range, and
initializing the intensity level of the plurality of cool white LEDs to a minimum level of the second intensity range.

15. The method of claim 14, further comprising:
iteratively decreasing the intensity level of the warm white LEDs by at least one level in each iteration, until the light generated by the lighting device matches the desired illuminance predetermined for the desired natural scene.

16. The method of claim 14, wherein the desired natural scene is a sunset scene or a sunrise scene having the desired correlated color temperature of about 2400K and having the desired illuminance of about 580 lx.

17. The method of claim 1, further comprising:
after the lighting device is controlled to generate the light of the desired natural scene,
periodically or instantaneously monitoring at least one of the correlated color temperature or the illuminance of the light generated by the lighting device, and
repeating adjusting at least one of the intensity level of the warm white LEDs or the intensity level of the cool white LEDs, if it is monitored that the light generated by the lighting device does not match at least one of the desired correlated color temperature or the desired illuminance.

18. The method of claim 1, wherein the plurality of warm white LEDs and the plurality of cool white LEDs are arranged in a matrix form, wherein the warm white LED alternates with the cool white LED along each row and each column of the matrix.

19. A lighting control system for controlling a lighting device to generate light of a desired natural scene, the lighting device comprising a plurality of warm white LEDs having a first intensity range and a plurality of cool white LEDs having a second intensity range, the system comprising:
at least one sensor configured to detect at least one of a correlated color temperature or an illuminance of the light generated by the lighting device; and
at least one controller configured to control the lighting device, the at least one controller being configured to:
divide each of the first intensity range and the second intensity range into a predetermined number of intensity levels;
initialize the plurality of warm white LEDs to a first intensity level and initialize the plurality of cool white LEDs to a second intensity level, the first intensity level and the second intensity level being determined based on the desired natural scene;

iteratively adjust at least one of the intensity level of the warm white LEDs or the intensity level of the cool white LEDs by at least one level in each iteration, until the light generated by the lighting device matches a desired correlated color temperature predetermined for the desired natural scene; and iteratively adjust at least one of the intensity level of the warm white LEDs or the intensity level of the cool white LEDs, until the light generated by the lighting device matches a desired illuminance predetermined for the desired natural scene.

* * * * *